United States Patent
Ishiwata et al.

(10) Patent No.: US 8,724,982 B2
(45) Date of Patent: May 13, 2014

(54) FOCUS CONTROL DEVICE, FOCUS CONTROL METHOD, LENS SYSTEM, FOCUS LENS DRIVING METHOD, AND PROGRAM

(75) Inventors: Hisashi Ishiwata, Tokyo (JP); Makibi Nakamura, Tokyo (JP)

(73) Assignee: Sony Corporation, Tokyo (JP)

(*) Notice: Subject to any disclaimer, the term of this patent is extended or adjusted under 35 U.S.C. 154(b) by 163 days.

(21) Appl. No.: 13/113,402

(22) Filed: May 23, 2011

(65) Prior Publication Data

US 2011/0293256 A1 Dec. 1, 2011

(30) Foreign Application Priority Data

May 28, 2010 (JP) ................ P2010-122169

(51) Int. Cl.
*G03B 3/00* (2006.01)
(52) U.S. Cl.
USPC ........................................ 396/104; 348/345
(58) Field of Classification Search
USPC ........................................ 396/104; 348/345
See application file for complete search history.

(56) References Cited

U.S. PATENT DOCUMENTS

| 4,219,261 | A  | * | 8/1980 | Rosner et al. | 396/147 |
| 7,519,285 | B2 | * | 4/2009 | Ishii | 396/102 |
| 2004/0165879 | A1 | * | 8/2004 | Sasaki et al. | 396/137 |
| 2005/0063693 | A1 | * | 3/2005 | Yoshibe et al. | 396/81 |
| 2005/0146790 | A1 | * | 7/2005 | Liu et al. | 359/586 |
| 2005/0271373 | A1 | * | 12/2005 | Tomita | 396/103 |
| 2007/0103577 | A1 | * | 5/2007 | Misawa et al. | 348/333.01 |

FOREIGN PATENT DOCUMENTS

JP 2009-48126 3/2009

* cited by examiner

*Primary Examiner* — Clayton E Laballe
*Assistant Examiner* — Linda B Smith
(74) *Attorney, Agent, or Firm* — Oblon, Spivak, McClelland, Maier & Neustadt, L.L.P.

(57) ABSTRACT

A focus control device includes: an in-detection-range focal depth number calculation section that calculates the number of in-detection-range focal depths as the number of focal depths, which are divided as division units and each of which depends on a position of a focus lens, in accordance with a detection range in which the focus lens is shifted in order to detect the contrast of a captured image signal; a detection interval determination section that determines the number of in-detection-interval focal depths, which represents the number of focal depths as the division units, as a detection interval in the detection range, in accordance with the calculated number of in-detection-range focal depths; and a focus lens shift instruction section that instructs a lens section to perform a focus search which shifts the focus lens by specifying the detection range and the number of in-detection-interval focal depths determined as the detection interval.

18 Claims, 13 Drawing Sheets

| NUMBER OF IN-DETECTION-RANGE FOCAL DEPTHS (N) | NUMBER OF IN-DETECTION-INTERVAL FOCAL DEPTHS (n) |
|---|---|
| $0 \leq N < 20$ | 5 |
| $20 \leq N < 100$ | 15 |
| $100 \leq N$ | 25 |

FOCUS CONTROL DEVICE, FOCUS CONTROL METHOD, LENS SYSTEM, FOCUS LENS DRIVING METHOD, AND PROGRAM

BACKGROUND OF THE INVENTION

1. Field of the Invention

The present invention relates to a focus control device, in particular, a focus control device, which performs autofocus control by using a contrast mode, a method therefor, and a program which causes the focus control device to implement the corresponding method. Further, the invention also relates to a lens system corresponding to such a focus control device, a focus lens driving method for the lens system, and a program which causes the lens system to implement the corresponding method.

2. Description of the Related Art

To perform an autofocus control, a contrast mode is used. If the contrast of a captured image is high, this means that the blur in the captured image is low by the same amount, and thus it can be assumed that this state corresponds to an in-focus state. The contrast mode is an autofocus control mode based on such an assumption.

Specifically, in the contrast mode, the contrast of the captured image signal is measured (detected) while shifting a focus lens. Then, by shifting the focus lens to a position at which the measured contrast becomes the maximum, it is possible to obtain a state (in-focus state) in which a subject is brought into focus.

In a practical contrast mode, the contrast is not continuously detected from a detection range in which the focus lens is shifted, but a plurality of detected values is obtained by performing detection at a plurality of detection positions which are separated from each other with intervals. Then, from such detected values, a focus lens position at which the contrast becomes the maximum is obtained.

In such a manner, in the contrast mode, a predetermined interval (a detection interval) is provided for each detection position in the detection range. As the detection interval increases, the number of detection positions in the detection range decreases. Therefore, the time necessary to detect the entire detection range decreases. However, as the detection interval increases, the amount of change in contrast for each detection position becomes large. Hence, the accuracy in detection of the position, at which the contrast becomes the maximum, becomes low. In contrast, when the detection interval becomes narrow, the amount of change in contrast for each detection position becomes small. Thus, the accuracy in detection of the position, at which the contrast becomes the maximum, becomes high. However, the time necessary to detect the entire detection range increases, and as a result, the time necessary to obtain the in-focus state also increases.

Accordingly, in the related art, there are existing configurations in which, as a user presses the release button halfway, the detection interval is changed in accordance with the depth of field at the start timing of the autofocus control. That is, for example, when a subject is near, the depth of field is shallow. In this case, the detection interval is changed to be narrow (for example, refer to Japanese Unexamined Patent Application Publication No. 2009-48126 (FIG. 15)). Thereby, it is possible to increase the accuracy of focusing even under situation in which focusing is difficult since the depth of field is small. On the other hand, when the depth of field is large, by setting a large detection interval, it is possible to shorten the time necessary to reach the in-focus state.

SUMMARY OF THE INVENTION

In the related art, in both cases where the detection interval is set to be large and is set to be small, the amount of shift of the focus lens corresponding to the detection interval is set to be constant. However, even when the detection interval is set such that the amount of shift of the focus lens is constant, the amount of change in the contrast of the image for each detection interval is irregularly changed by the effects of focus sensitivity and the like. This is a factor that decreases the accuracy in detection of the in-focus position.

Specifically, in accordance with the shift direction in the case of practical detection, as the focus lens is sequentially shifted for each detection interval, the amount of change in contrast is changed to increase. Accordingly, since the differences among detected values of the respective detection positions increases, it becomes difficult to perform interpolation calculation for obtaining, for example, the position, at which the contrast becomes the maximum, at a high accuracy. As a result, it becomes difficult to obtain a desirable in-focus state. In addition, in a case of adopting a configuration in which the detection interval is changed, such a problem tends to arise when the detection interval is changed to be large.

The invention has been made in view of the above situation, and addresses the issue of making constant the amount of change in contrast of each detection interval at time of setting the detection interval in the detection range.

According to a first embodiment of the invention, a focus control device including: an in-detection-range focal depth number calculation section that calculates the number of in-detection-range focal depths as the number of focal depths, which are divided as division units and each of which depends on a position of a focus lens, in accordance with a detection range in which the focus lens is shifted in order to detect the contrast of a captured image signal; a detection interval determination section that determines the number of in-detection-interval focal depths, which represents the number of focal depths as the division units, as a detection interval in the detection range, in accordance with the calculated number of in-detection-range focal depths; and a focus lens shift instruction section that instructs a lens section to perform a focus search which shifts the focus lens by specifying the detection range and the number of in-detection-interval focal depths determined as the detection interval. This configuration provides an effect whereby it is possible to set the detection interval on the basis of the number of focal depths as division units of the detection range.

Further, in the first embodiment, it is preferable that the in-detection-range focal depth number calculation section should calculate the number of in-detection-range focal depths on the basis of an aperture value which is input from the lens section, a focal length which is input from the lens section, a circle of confusion diameter limit which is stored in the corresponding focus control device, and the farthest distance and the nearest distance from and to a principal point corresponding to the detection range. This configuration provides an effect whereby it is possible to calculate the number of in-detection-range focal depths from respective values of the aperture value, the focal length, the circle of confusion diameter limit, and the farthest distance and nearest distance.

Further, in the first embodiment, it is preferable that the focus control device should further include a detection range determination section that, as a single operation of the focus search is completed, newly determines the detection range for the subsequent focus search. In addition, it is also preferable that the detection interval determination section should determine, in accordance with the determined detection range, the number of in-detection-interval focal depths associated with the detection range. This configuration provides an effect whereby it is possible to determine the number of in-detection-interval focal depths in accordance with each detection range which is newly determined.

Further, in the first embodiment, it is preferable that, when the number of in-detection-interval focal depths determined as the detection interval is the predetermined minimum, the focus lens shift instruction section should instruct the lens section to perform the final focus search by specifying the minimum of the number of in-detection-interval focal depths, and instructs the lens section to shift the focus lens to an in-focus position which can be calculated on the basis of the contrast detected through the final focus search. This configuration provides an effect whereby it is possible to perform the focus lens shift for focusing after the focus search based on the number of in-detection-interval focal depths defined as the minimum.

Further, in the first embodiment, it is preferable that the detection interval determination section should select the number of in-detection-interval focal depths, which can be associated with the calculated number of in-detection-range focal depths, on the basis of detection interval information in which the numbers of in-detection-range focal depths are associated with the numbers of in-detection-interval focal depths, thereby determining the number of in-detection-interval focal depths corresponding to the detection interval. This configuration provides an effect whereby, by selecting the number of in-detection-interval focal depths which can be associated with the calculated number of in-detection-range focal depths on the basis of the detection interval information, it is possible to determine the number of in-detection-interval focal depths as the detection interval in the detection range.

Further, in the first embodiment, it is preferable that the focus control device should further include a communication section that communicates with the lens section in a state where the lens section removable from a main body of the corresponding focus control device is mounted. This configuration provides an effect whereby it is possible to perform the instruction to shift the focus lens for each lens section mounted thereon.

Further, according to a second embodiment of the invention, a lens system includes: a communication section that communicates with a main body of an image capturing apparatus in a state where the communication section is mounted on the main body of the image capturing apparatus; a focus lens shift calculation section that calculates the number of focal depths, which represents a detection interval, as an amount of shift of a focus lens in response to receiving an instruction to shift the focus lens from the main body of the image capturing apparatus by specifying a detection range, in which the focus lens is shifted in order to detect the contrast of a captured image signal, and a detection interval represented by the number of focal depths which are division units of the detection range and each of which depends on a position of the focus lens; and a focus lens drive control section that shifts the focus lens on the basis of the calculated amount of shift of the focus lens. This configuration provides an effect whereby it is possible to shift the focus lens in accordance with the number of focal depths specified as the detection interval.

Further, in the second embodiment, it is preferable that the focus lens shift calculation section should calculate the amount of shift of the focus lens on the basis of a focus sensitivity which is specified on the basis of a focus lens position, an aperture value, and a focal length, a circle of confusion diameter limit which is input from the main body of the image capturing apparatus, and the number of focal depths which represents the specified detection interval. This configuration provides an effect whereby it is possible to calculate the amount of shift of the focus lens on the basis of respective values of the focus sensitivity, the circle of confusion diameter limit, and the number of focal depths as the detection interval.

Further, in the second embodiment, it is preferable that, whenever the focus lens is shifted to a new position on the basis of the calculated amount of shift of the focus lens, the focus lens shift calculation section should calculate the amount of shift of the focus lens corresponding to the new position. This configuration provides an effect whereby it is possible to calculate the amount of shift of the focus lens in which the focal depth changed by the focus lens position is reflected.

According to the embodiments of the invention, there is a beneficial effect whereby it is possible to make constant the amount of change in contrast for each detection interval which is set in accordance with the single focus search under the autofocus control using the contrast mode.

BRIEF DESCRIPTION OF THE DRAWINGS

FIG. 7 is a diagram illustrating an exemplary structure of a detection interval table;

DESCRIPTION OF THE PREFERRED EMBODIMENTS

Hereinafter, the preferred embodiments (hereinafter referred to as embodiments) will be described. Description will be given in order of the following items.

Figure 1:
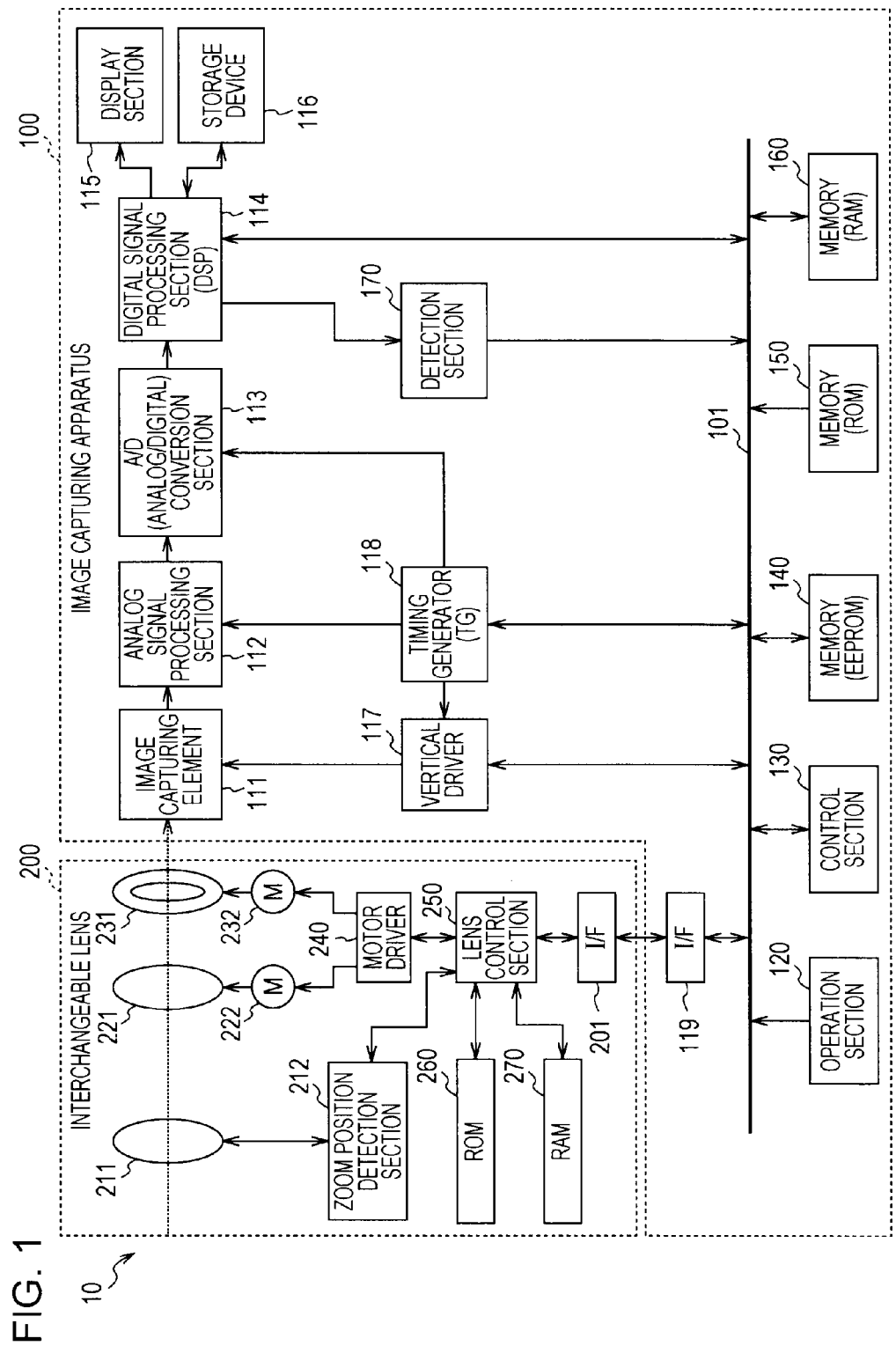
FIG. 1 is a diagram illustrating an exemplary configuration of an image capturing system according to an embodiment of the invention.

1. First Embodiment (Detection Interval Setting Based on Number of Focal Depths)
2. Modified Examples 1. First Embodiment Internal Configuration Example of Image Capturing System FIG. 1 is a block diagram illustrating an internal configuration example of an image capturing system 10 according to a first embodiment of the invention. The image capturing system 10 includes an image capturing apparatus 100 and an interchangeable lens 200. The image capturing system 10 is realized by, for example, a digital still camera (for example, a digital single-lens camera) in which the lens is interchangeable. In addition, by using the image capturing apparatus 100, a focus control device according to the embodiment of the invention is embodied. Further, by using the interchangeable lens 200, a lens section or a lens system according to the embodiment of the invention is embodied.

The image capturing apparatus 100 is an image capturing apparatus that generates image data (captured image) by capturing an image of a subject and stores the generated image data as image content (still image content or moving image content). Further, the image capturing apparatus 100 has a lens mount mechanism (not shown in the drawings), whereby the interchangeable lens 200 can be mounted thereon or removed therefrom. With such a configuration, sometimes a user may interchange a plurality of interchangeable lenses 200 in the image capturing apparatus 100 in accordance with, for example, a photography situation or a photography purpose.

The interchangeable lens 200 is an interchangeable lens unit which is mounted on the image capturing apparatus 100 through the lens mount mechanism (not shown in the drawings). The interchangeable lens 200 includes a zoom lens 211, a zoom position detection section 212, a focus lens 221, a focus lens drive motor 222, a diaphragm mechanism 231, a diaphragm drive motor 232, a motor driver 240, and a lens control section 250. Further, the interchangeable lens 200 includes a ROM 260 (Read Only Memory), and a RAM (Random Access Memory) 270. Further, the interchangeable lens 200 includes an interface section 201.

The zoom lens 211 is a lens that is shifted in a direction of the optical axis through electric drive or manual drive so as to adjust the focal length. That is, the zoom lens 211 is a lens which is driven back and forth relative to the subject in order to enlarge or reduce the subject included in a captured image. Further, the zoom lens 211 implements a zoom function. In addition, the first embodiment of the invention shows an example of drive of the zoom lens 211 based on the user's manual operation.

The zoom position detection section 212 detects the position of the zoom lens 211 driven by the user's zoom operation, and outputs the detection result to the lens control section 250.

The focus lens 221 is a lens that is shifted in the direction of the optical axis through the drive of the focus lens drive motor 222 so as to adjust the focus. That is, the focus lens 221 is a lens used to bring the subject into focus (to make the subject be in focus). Further, the focus lens 221 implements an auto-focus function.

The focus lens drive motor 222 drives the focus lens 221 on the basis of the control of the motor driver 240.

The diaphragm mechanism 231 adjusts the amount of incident light which passes through the zoom lens 211 and the focus lens 221, and supplies the adjusted light to an imaging element 111. The diaphragm mechanism 231 is driven by the diaphragm drive motor 232 so as to adjust the aperture of the diaphragm.

The diaphragm drive motor 232 drives the diaphragm mechanism 231 on the basis of the control of the motor driver 240.

That is, the zoom lens 211 and the focus lens 221 are a lens group that concentrates the light incident from the subject, and the light concentrated through such a lens group is incident on the imaging element 111 through the diaphragm mechanism 231.

The motor driver 240 is a driver that drives the focus lens drive motor 222 and the diaphragm drive motor 232 on the basis of the control of the lens control section 250.

The lens control section 250 controls the respective sections (the focus lens 221, the diaphragm mechanism 231, and the like) constituting the interchangeable lens 200. The lens control section 250 is constituted by, for example, a CPU (Central Processing Unit).

The ROM 260 is a section that stores unique information, which relates to the respective members constituting the interchangeable lens 200, a program, which will be executed in the CPU as the lens control section 250, and the like. The RAM 270 is a section that is used as a work area when the lens control section 250 executes calculation processing. The interface section 201 is a section that is for communicating with the image capturing apparatus 100.

Next, the image capturing apparatus 100 includes a system bus 101, an imaging element 111, an analog signal processing section 112, and an A/D (Analog/Digital) conversion section 113. Further, the image capturing apparatus 100 includes a digital signal processing section 114, a display section 115, and a storage device 116. Further, the image capturing apparatus 100 includes a vertical driver 117, a timing generator 118, an operation section 120, and a control section 130. Further, the image capturing apparatus 100 includes a memory (EEPROM (Electrically Erasable and Programmable Read Only Memory)) 140, a memory (ROM (Read Only Memory)) 150, and a memory (RAM (Random Access Memory)) 160. Further, the image capturing apparatus 100 includes an interface section 119. Further, the image capturing apparatus 100 includes a detection section 170.

In addition, the digital signal processing section 114, the vertical driver 117, the timing generator 118, the operation section 120, and the detection section 170 are connected so as to be able to communicate with, for example, the control section 130 through the system bus 101. Further, the memory (EEPROM) 140, the memory (ROM) 150 and the memory 160 (RAM) are connected so as to be able to communicate with the control section 130 and the like through the system bus 101.

The imaging element 111 is a photoelectric conversion element that receives the light (the incident light) which is supplied through the zoom lens 211, the focus lens 221, and the diaphragm mechanism 231 so as to convert the incident light into an electric signal, and supplies the converted electric signal to the analog signal processing section 112. Further, the imaging element 111 is driven by the vertical driver 117. In addition, as the imaging element 111, it is possible to use, for example, a CCD (Charge Coupled Device) sensor, a CMOS (Complementary Metal Oxide Semiconductor) sensor, and the like.

The analog signal processing section 112 performs the analog signal processing, such as a noise removal process on the electric signal, which is supplied from the imaging element 111, at the timing of receiving the instruction of the timing generator 118. The analog signal, which is subjected to the analog signal processing in the analog signal processing section 112, is supplied to the A/D conversion section 113.

The A/D conversion section 113 converts the analog signal, which is supplied from the analog signal processing section 112, into a digital signal at the timing of receiving the instruction of the timing generator 118, and supplies the converted digital signal to the digital signal processing section 114.

The digital signal processing section 114 performs image processing, such as black level correction, white balance adjustment, and γ correction on the digital signal, which is supplied from the A/D conversion section 113, on the basis of the control of the control section 130. Then, the digital signal processing section 114 supplies the image data, which is subjected to the image processing, to the display section 115 and the storage device 116. For example, the digital signal processing section 114 performs a compression process on the image data subjected to the image processing, and supplies the image data (the compressed image data) subjected to the compression process to the storage device 116. In addition, as a compression format, it is possible to employ, for example, the JPEG (Joint Photographic Experts Group) format. Further, it is also possible to supply image data based on a RAW data format, on which the compression process is not performed, to the storage device 116. Further, the digital signal processing section 114 performs a decompression process on the compressed image data which is stored in the storage device 116, and supplies the image data subjected to the decompression process to the display section 115. In addition, the digital signal processing section 114 can be embodied by a signal processing device as a DSP (Digital Signal Processor).

The display section 115 is a display device that displays the image data which is supplied from the digital signal processing section 114. The display section 115 displays, for example, the image data, on which the digital signal processing section 114 performs the image processing, as a through-the-lens image. Further, for example, the display section 115 displays the image data, which is stored in the storage device 116, as a list image. As the display section 115, it is possible to use, for example, a display panel such as an organic EL (Electro Luminescence) panel or an LCD (Liquid Crystal Display).

The storage device 116 is a section that stores the image data on which the digital signal processing section 114 performs the image processing. Further, the image data stored in the storage device 116 is supplied to the digital signal processing section 114. In addition, the storage device 116 may be built in the image capturing apparatus 100, and may be removable from the image capturing apparatus 100. Further, as the storage device 116, it is possible to use various media such as a semiconductor memory, an optical recording medium, a magnetic disk, and a HDD (Hard Disk Drive). In addition, as the optical recording medium, it is possible to use, for example, a recordable DVD (Digital Versatile Disc), a recordable CD (Compact Disc), a BD (Blu-ray Disc, registered trademark), and the like.

The vertical driver 117 is a section that drives the imaging element 111 on the basis of the control of the control section 130. The timing generator 118 is a section that gives an instruction of timings for respectively operating the analog signal processing section 112 and the A/D conversion section 113 on the basis of the reference clock which is supplied from the control section 130. Specifically, the instruction of the operation timing is performed, for example, by outputting the timing signal generated on the basis of the reference clock to the analog signal processing section 112 and the A/D conversion section 113.

The operation section 120 is an operation section that has operation members, such as buttons and switches, for performing various operations so as to receive an operation input from a user, and outputs the contents of the received operation input to the control section 130 through the system bus 101. In addition, by providing not only the operation members such as the buttons which are disposed on the exterior surface of the image capturing apparatus 100 but also a touch panel on the display section 115, the operation input from a user may be received through the touch panel.

The memory (ROM) 150 is a non-volatile memory that stores programs executed in the control section 130 and various data.

The memory (RAM) 160 is a volatile memory that retains rewritable data and data which should be temporarily retained at the time of the operation of the control section 130, and is used as, for example, a work memory for the operation of the control section 130. The memory (EEPROM) 140 is a memory that retains data even while the power of the image capturing apparatus 100 is off, and stores various setting conditions and the like. The interface section 119 is connected to the interface section 201 on the side of the interchangeable lens 200 mounted on the image capturing apparatus 100 so as to communicate with the interchangeable lens 200. The interface section 119 and the interface section 201 are examples of the communication sections described in the claims.

The control section 130 is a section that is formed of, for example, the CPU, which executes the programs stored in the memory (ROM) 150, and the like, and controls the respective sections of the image capturing apparatus 100 on the basis of each information stored in the memory 150. The control section 130 controls, for example, exposure, white balance, focus, lighting a flash, and the like. Further, for example, at the time of capturing an image, the control section 130 generates the control signal on the basis of the user's operation input from the operation section 120 and the image information from the digital signal processing section 114. Then, the generated control signal is output to the motor driver 240, the vertical driver 117, the timing generator 118, and the like so as to operate the focus lens 221, the diaphragm mechanism 231, and the like, thereby controlling exposure, white balance, focus, the flash, and the like.

Further, in a case of storing the image data on which the digital signal processing section 114 performs the image processing, the control section 130 outputs the control signal to the digital signal processing section 114 on the basis of the user's operation input from the operation section 120. Then, the image data on which the digital signal processing section 114 performs the compression process is stored as a still image file in the storage device 116. Further, in a case of displaying the still image file stored in the storage device 116, the control section 130 outputs the control signal to the digital signal processing section 114 on the basis of the user's operation input from the operation section 120. Then, an image corresponding to the still image file stored in the storage device 116 is displayed on the display section 115.

The detection section 170 is a section that calculates the evaluated value of the contrast by performing detection for extracting contrast components from the image signal in accordance with the autofocus control based on the contrast mode which is employed in the image capturing apparatus 100. The control section 130 performs, on the basis of the evaluated value generated by the detection section 170, the autofocus control for shifting the focus lens 221 so as to achieve the in-focus state. In addition, practically, the detection section 170 may be provided as, for example, a single function which is executed by the digital signal processing section 114. Alternately, it may be possible to adopt a configuration in which at least a part of the signal processing function is executed by the control section 130.

Exterior Configuration Example of Image Capturing System

Figure 2A:
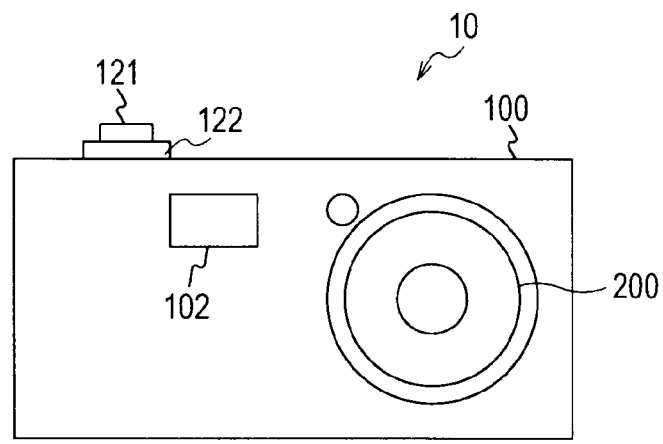
FIGS. 2A to 2C are diagrams illustrating an exemplary appearance of the image capturing system according to the embodiment of the invention.
Figure 2B:
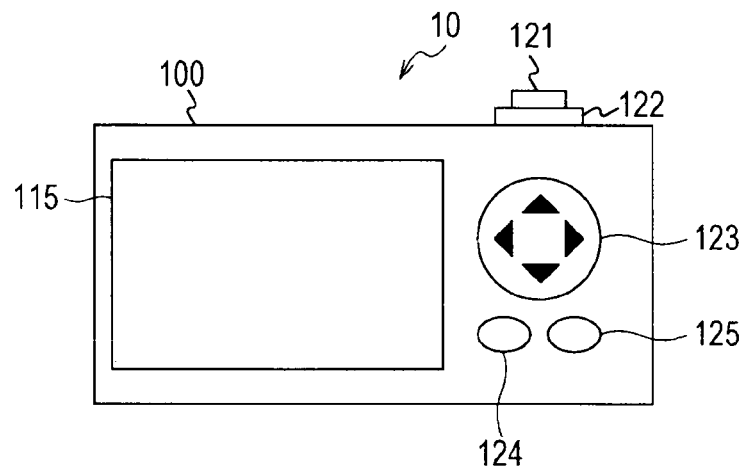
Figure 2C:
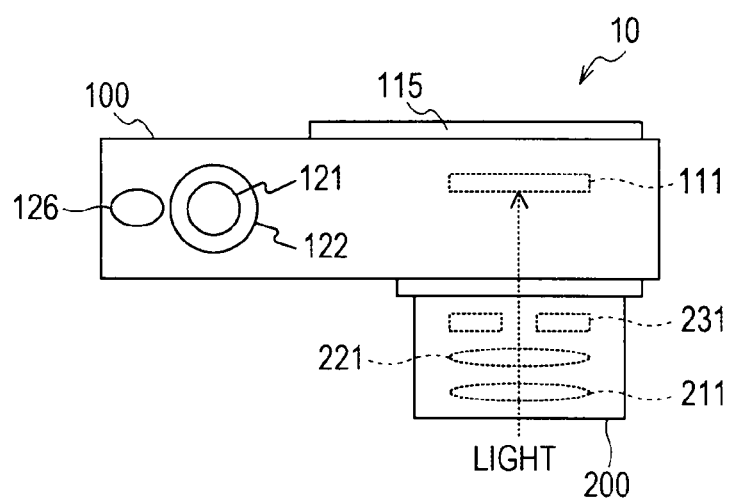

FIGS. 2A to 2C are diagrams illustrating an exterior configuration example of the image capturing system 10 according to the first embodiment of the invention. FIG. 2A is a front view illustrating an appearance of the image capturing system 10. FIG. 2B is a rear view illustrating an appearance of the image capturing system 10. FIG. 2C is a top view illustrating an appearance of the image capturing system 10.

The image capturing apparatus 100 includes a flash lighting section 102, the imaging element 111, the display section 115, a shutter button 121, a mode dial 122, a up-down right-left operation button 123, a determination button 124, a cancel button 125, and a power switch 126. Further, the interchangeable lens 200 includes the zoom lens 211, the focus lens 221, and the diaphragm mechanism 231. In addition, the shutter button 121, the mode dial 122, the up-down right-left operation button 123, the determination button 124, the cancel button 125, and the power switch 126 correspond to the operation section 120 shown in FIG. 1. Further, the imaging element 111, the display section 115, the zoom lens 211, the focus lens 221, and the diaphragm mechanism 231 correspond to the respective same named sections shown in FIG. 1. Hence, a detailed description thereof will be omitted herein. In addition, the zoom lens 211, the focus lens 221, the diaphragm mechanism 231 are built in the interchangeable lens 200, and the imaging element 111 is built in the image capturing apparatus 100. Hence, those are indicated by the dotted line in FIGS. 2A to 2C.

The flash lighting section 102 irradiates the subject with rays on the basis of the control of the control section 130 (shown in FIG. 1) so as to increase light (reflected light) from the subject. Thereby, it is possible to capture an image even in a situation in which ambient illuminance is low.

The shutter button 121 is an operation member for performing a shutter operation, and allows a user to perform a full-press operation or a half-press operation thereon. For example, when the shutter button 121 is pressed halfway, the autofocus control and automatic control most appropriate for image capturing are performed. Further, when the shutter button 121 is pressed fully, the data of image, which is captured at the time of the full-press operation through the autofocus control and automatic control most appropriate for image capturing, is stored in the storage device 116.

The mode dial 122 is a dial for setting the respective modes. For example, a bracket imaging mode, an image display mode for displaying the image stored in the storage device 116, and the like are set by the operation of the mode dial 122.

The up-down right-left operation button 123 is an operation button that is used when an item such as a button or an image displayed on the display section 115 is selected, and moves the currently selected item corresponding to the pressed portion in directions of up, down, right, and left.

The determination button 124 is a button that is used when the selection state of the respective items displayed on the display section 115 is confirmed. The cancel button 125 is a button that is used to release the confirmation when the selection state of the respective items displayed on the display section 115 was confirmed.

The power switch 126 is a switch that changes the ON/OFF state of the power to the image capturing apparatus 100.

Further, in the image capturing system 10, a zoom operation is performed by user's manual operation. The zoom operation is performed, for example, in a state where a prescribed portion of the interchangeable lens 200 is held by user's hand. For example, when the zoom operation is performed by the user's manual operation, the zoom function is controlled in accordance with the manual operation, whereby it is possible to enlarge or reduce the subject included in the capture image.

Autofocus Control Based on Contrast Mode

The image capturing system 10 according to the embodiment of the invention employs the contrast mode as the autofocus control for automatically achieving the in-focus state.

A basic operation of the autofocus control based on the contrast mode according to the embodiment of the invention is, for example, as follows. First, the focus lens is sequentially shifted to a plurality of detection positions in the shift range (the detection range) of the focus lens which is set in accordance with the focus control. This operation can be considered as a search for the focus position (the in-focus position) at which the in-focus state is achieved, and is thus herein referred to as focus search. Then, the evaluated value of the contrast of the image captured for each detection position is calculated.

In order to calculate the evaluated value for each detection position, first, the luminance signal component in the captured image signal is passed through the high pass filter (HPF) with prescribed characteristics. Thereby, the absolute value (the differential absolute value) of the amplitude corresponding to the high frequency component of the luminance signal is detected. That is, by detecting the captured image signal, the contrast component is extracted. Then, the value, which can be obtained by integrating the detected differential absolute value, is the evaluated value. The evaluated value can be obtained on the basis of the high frequency component of the luminance signal of the video signal, and thus represents an intensity of contrast of the image.

Figure 3:
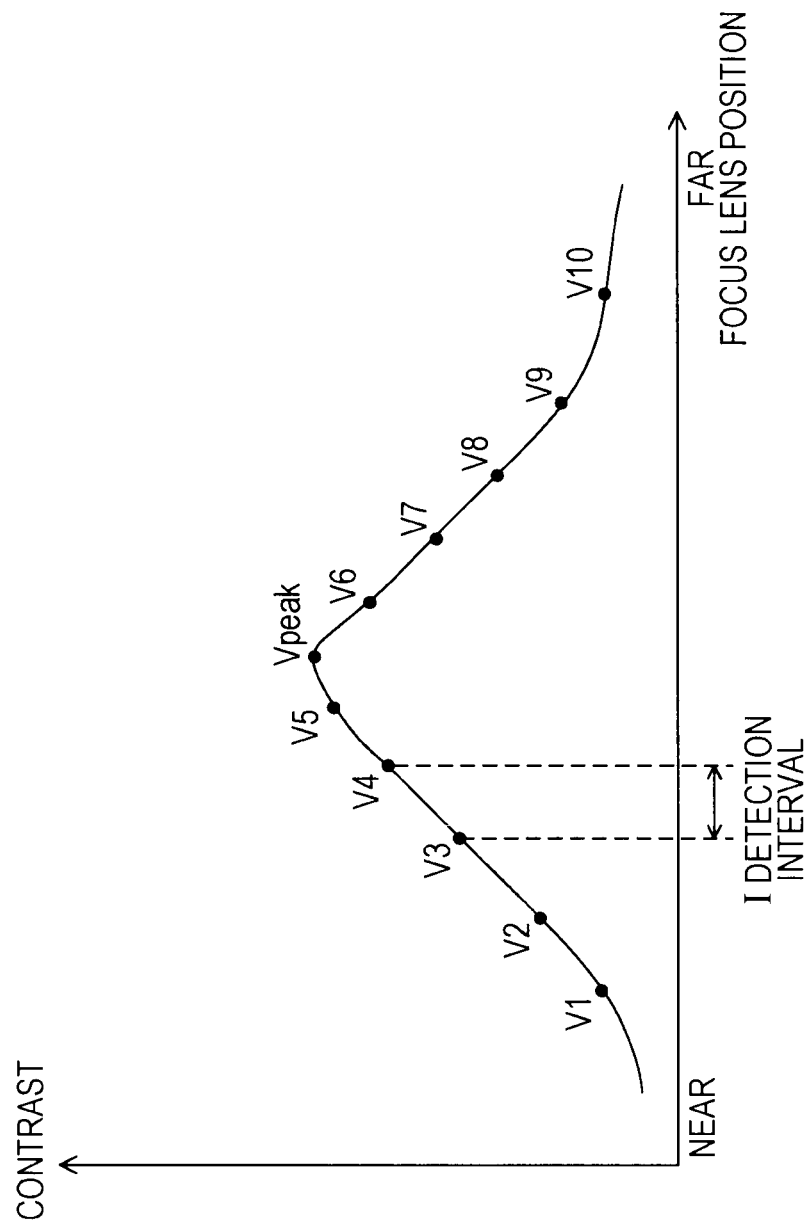
FIG. 3 is a diagram illustrating a brief overview of operations of autofocus control based on the contrast mode according to the embodiment of the invention.

FIG. 3 shows a relationship between the evaluated value and the lens position of the focus lens (the focus lens position). The drawing shows the operation of the focus search for acquiring the evaluated values V1 to V10 at 10 mutually different focus lens positions while shifting the focus lens from the near side to the far side relative to the principal point. The focus lens positions, at which the evaluated values V1 to V10 are acquired, is the detection positions. The range from the detection position, at which the evaluated value V1 is acquired, to the detection position, at which the evaluated value V10 is acquired, is the detection range.

After all the evaluated values in the detection range are acquired in such a manner, for example, by the interpolation calculation using these evaluated values, the focus lens position, at which the peak evaluated value Vpeak can be obtained, is calculated. The focus lens position, at which the peak evaluated value Vpeak can be obtained, is herein referred to as an in-focus position. Then, the focus lens is driven so as to be shifted to the in-focus position. Thereby, it is possible to automatically achieve the state in which the subject is in focus.

In addition, in the drawing, the number of the evaluated values to be acquired, that is, the number of the detection positions in the detection range is set to 10. However, the number is set for the convenience of description in all respects, and may be different in actual circumstances. Further, in the embodiment of the invention, as will be described later, the number of the detection positions in the detection range can be changed. Further, in the embodiment of the invention, until the definitive in-focus position is obtained, the focus search is repeatedly performed while changing the detection range.

Moreover, in the embodiment of the invention, each detection interval I is set, as will be described later, so as to make the number of focal depths d constant when the focal depth d is a single unit. By setting each detection interval I in such a manner, the amount of change in contrast, which is obtained when the focus lens 221 is shifted for each detection interval I in the detection range, is made to be constant.

Functional Configuration Example of Image Capturing System

Figure 4:
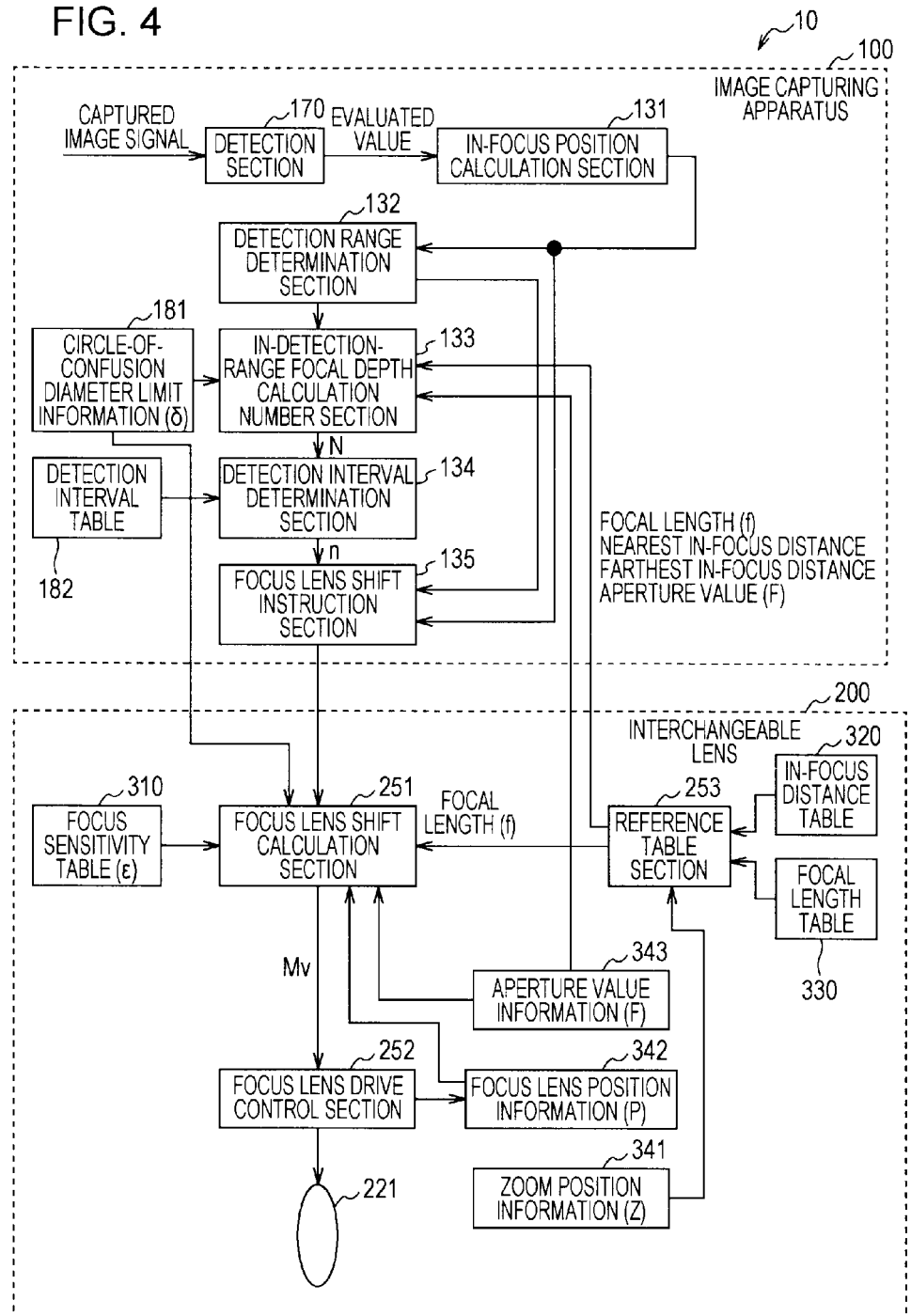
FIG. 4 is a diagram illustrating a functional configuration example of the image capturing system.

FIG. 4 shows a functional configuration example of the image capturing system 10 according to the embodiment of the invention. It should be noted that, in the drawing, the elements common to those of FIG. 1 are represented by the same reference numerals and signs. The image capturing apparatus 100 shown in the drawing includes the detection section 170, an in-focus position calculation section 131, a detection range determination section 132, an in-detection-range focal depth number calculation section 133, a detection interval determination section 134, and a focus lens shift instruction section 135. Further, the image capturing apparatus 100 stores a detection interval table 182 and a circle-of-confusion diameter limit information 181. In addition, as compared with the configuration of FIG. 1, the control section 130 corresponds to the respective functions of the in-focus position calculation section 131, the detection range determination section 132, the in-detection-range focal depth number calculation section 133, the detection interval determination section 134, and the focus lens shift instruction section 135. That is, the respective functions are implemented by causing the control section (CPU) 130 to execute programs.

The detection section 170 is, similarly to the description of FIG. 1, a section that calculates the evaluated value of contrast by performing the detection on the captured image signal input from the digital signal processing section 114.

The in-focus position calculation section 131 is a section that calculates the in-focus position by executing, for example, interpolation calculation on the basis of the evaluated value which is input from the detection section 170.

The detection range determination section 132 is a section that determines the detection range for each single focus search. In addition, in the case of determining the detection range in and after the second focus search, the detection range determination section 132 uses information on the in-focus position which is calculated by the in-focus position calculation section 131 in the previous focus search.

The in-detection-range focal depth number calculation section 133 is a section that calculates the number of focal depths (the number of in-detection-range focal depths) corresponding to the detection range which is determined by the detection range determination section 132. When the focal depth d is treated as a single unit, the number of in-detection-range focal depths represents how many focal depths d correspond to the detection range. For example, if a certain detection range corresponds to 10 focal depths d, the number of in-detection-range focal depths is set to "10". The in-detection-range focal depth number calculation section 133 uses the circle-of-confusion diameter limit information 181 when calculating the number of in-detection-range focal depths. Further, the in-detection-range focal depth number calculation section 133 also uses information on the focal length f, the nearest in-focus distance, the farthest in-focus distance, and the aperture value F which are input from the interchangeable lens 200. A method of calculating the number of in-detection-range focal depths will be described later.

In addition, regarding information on the focal length f, the nearest in-focus distance, the farthest in-focus distance, and the aperture value F, for example, the respective current values at that time are transmitted from the interchangeable lens 200 side for each fixed time. Such information is transmitted and received through the interface section 201 on the interchangeable lens 200 side and the interface section 119 of the image capturing apparatus 100, corresponding to FIG. 1.

The circle-of-confusion diameter limit information 181 is information that represents the value of the circle of confusion diameter limit $\delta$. The circle of confusion diameter limit $\delta$ is an eigenvalue of the image capturing apparatus 100 which is uniquely determined in accordance with the pixel size and the like of the imaging element 111 shown in FIG. 1. In the image capturing apparatus 100, the circle-of-confusion diameter limit information 181 is stored in advance at the time of manufacture. The circle-of-confusion diameter limit information 181 can be stored in, for example, the memory (EEPROM) 140 or the memory (ROM) 150, corresponding to FIG. 1.

The detection interval determination section 134 is a section that determines the detection interval in the determined detection range on the basis of the number of in-detection-range focal depths N and the detection interval table 182. Although the detailed description of the detection interval table 182 will be described later, the table has a structure in which each range of the number of in-detection-range focal depths divided in advance is associated with the number of focal depths corresponding to the detection interval. That is, the detection interval determination section 134 determines the detection interval on the basis of the number of focal depths. The detection interval table 182 can be stored in the memory 140 or the memory 150, corresponding to FIG. 1. In addition, the detection interval table 182 is an example of the detection interval information described in the claims.

The focus lens shift instruction section 135 is a section that instructs the interchangeable lens 200 to shift the focus lens in accordance with the autofocus control based on the contrast mode. The focus lens shift instruction section 135 gives an instruction to execute the focus search by specifying the detection range and the detection interval. Further, in response to obtaining the definitive in-focus position by repeatedly performing the focus search a certain number of times, the instruction to shift the focus lens is also issued by specifying the focus lens position as the in-focus position.

Next, the interchangeable lens 200 includes a focus lens shift calculation section 251, a focus lens drive control section 252, and a reference table section 253. Such respective functional sections are implemented by causing the lens control section (CPU) 250 shown in FIG. 1 to execute programs. Further, the interchangeable lens 200 stores a focus sensitivity table 310, an in-focus distance table 320, and a focal length table 330. These tables are stored in ROM 260, for example, at the time of manufacture, corresponding to FIG. 1. Further, the interchangeable lens 200 retains zoom position information 341, focus lens position information 342, and aperture value information 343. Such information is updated in accordance with the positions and the states of the zoom lens 211, the focus lens 221, and the diaphragm mechanism 231 in practical use, and is retained in RAM 270, corresponding to FIG. 1.

The focus lens shift calculation section 251 is a section that calculates the physical amount of shift of the focus lens corresponding to the detection interval which is specified by the image capturing apparatus 100 (the focus lens shift instruction section 135). In the embodiment of the invention, the detection interval, which is specified by the image capturing apparatus 100, is represented by the number of focal depths. The focus lens shift calculation section 251 converts the detection interval based on the number of focal depths into a physical shift amount.

Hence, the focus lens shift calculation section 251 specifies and selects one focus sensitivity $\epsilon$ corresponding to the combination of the focal length f, the aperture value F, and the focus lens position P from the focus sensitivity table 310. The focal length f is acquired by causing the reference table section 253, which will be described later, to select it from the focal length table 330. Further, the aperture value F is acquired by reading the aperture value information 343. The focus lens position P is acquired by reading the focus lens position information 342. In addition, the exemplary structure of the focus sensitivity table 310 will be described later.

Next, the focus lens shift calculation section 251 calculates the amount of lens shift Mv, as will be described later, on the basis of the value of the selected focus sensitivity $\epsilon$, the value of the circle of confusion diameter limit $\delta$ represented by the circle-of-confusion diameter limit information 181 which is input from the image capturing apparatus 100 side, and the aperture value F. The amount of lens shift Mv represents the physical amount of shift of the focus lens corresponding to the detection interval.

The focus lens drive control section 252 is a section that controls drive of the focus lens 221, and performs the drive control of the focus lens 221 according to the focus search at the time of the autofocus control. For example, the focus lens drive control section 252 drives the focus lens 221 to shift on the basis of the amount of lens shift Mv corresponding to the detection interval. Further, when the in-focus position is designated, the focus lens 221 is driven to shift to the in-focus position.

Further, as the aperture value is set in accordance with the user operation or the exposure control, the focus lens drive control section 252 sets the aperture size of the diaphragm corresponding to the aperture value which is set by driving the diaphragm mechanism 231.

Further, the focus lens drive control section 252 detects the focus lens position whenever driving the focus lens 221, and updates the focus lens position information 342.

In the embodiment of the invention, the zoom position of the zoom lens 211 is configured to be manually changed. The zoom position information 341 is updated whenever the zoom position is manually changed in such a manner. As described above, the zoom position is detected by the zoom position detection section 212 of FIG. 1.

The in-focus distance table 320 is a table having a structure in which the combinations of the in-focus distances (the nearest in-focus distance and the farthest in-focus distance) are associated with the zoom positions Z. The in-focus distance is one of characteristics relating to the focus lens. The nearest in-focus distance means the shortest distance in the range of the distance from the subject which can be in focus. Further, the farthest in-focus distance means the longest distance in the range of the distance from the subject which can be in focus. The nearest in-focus distance and the farthest in-focus distance are changed in accordance with the zoom position. Hence, as described above, the in-focus distance table 320 is a table in which the in-focus distances are associated with the zoom positions Z.

The focal length f is also changed in accordance with the zoom position Z. The focal length table 330 is a table having a structure in which the focal lengths of the optical system in the interchangeable lens 200 are associated with the zoom positions Z.

The reference table section 253 is a section that refers to the in-focus distance table 320 and the focal length table 330. That is, the reference table section 253 selects and outputs, from the in-focus distance table 320, the in-focus distances (the nearest in-focus distance and the farthest in-focus distance) which can be associated with the zoom position Z indicated by the zoom position information 341. Further, the reference table section 253 selects and outputs, from the focal length table 330, the focal length f which can be associated with the zoom position Z indicated by the zoom position information 341.

Calculation Example of Number of In-Detection-Range Focal Depths

Figure 5:
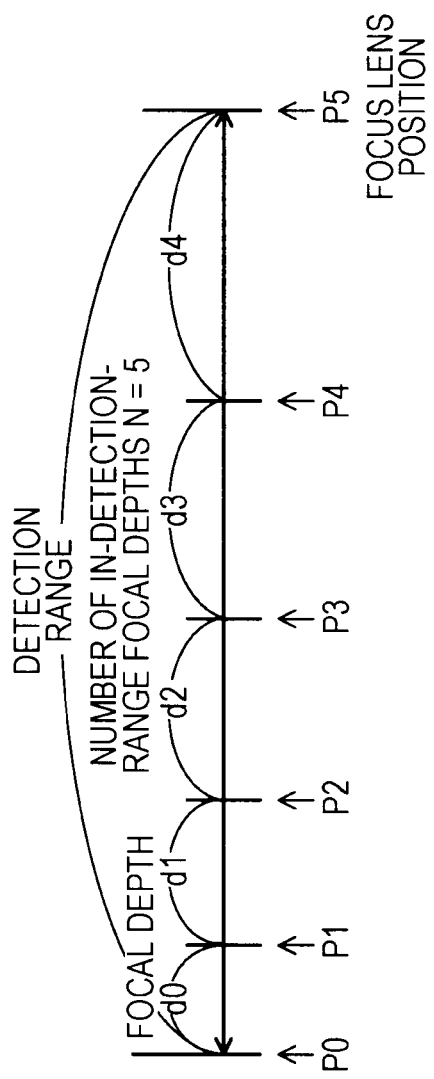
FIG. 5 is a diagram illustrating a concept of the number of in-detection-range focal depths.

First, referring to FIG. 5, a description will be given of the concept of the number of in-detection-range focal depths in the embodiment of the invention. FIG. 5 shows a detection range from a certain focus lens position P0 to P5. Here, at the focus lens position P0, the focal depth is d0. Accordingly, the focus lens is shifted to the focus lens position P1 at a distance of the focal depth d0 away from the focus lens position P0. The focal depth is changed in accordance with the focus lens position. Here, at the focus lens position P1, the focal depth is d1 larger than d0. Therefore, the focus lens is shifted to the focus lens position P2 at a distance of the focal depth d1 away from the focus lens position P1. Thereafter, likewise, the focus lens is sequentially shifted to each of the focus lens positions P2 to P4 by each of the focal depths d2 to d4. As a result, in FIG. 5, the detection range is divided into five sections of the section from the focus lens position P0 to P1, the section from P1 to P2, the section from P2 to P3, the section from P3 to P4, and the section from P4 to P5. That is, the detection range shown in FIG. 5 is divided into five sections when the focal depths are treated as division units, and thus corresponds to five focal depths. Thus, in FIG. 5, the number of in-detection-range focal depths N is "5".

Figure 6A:
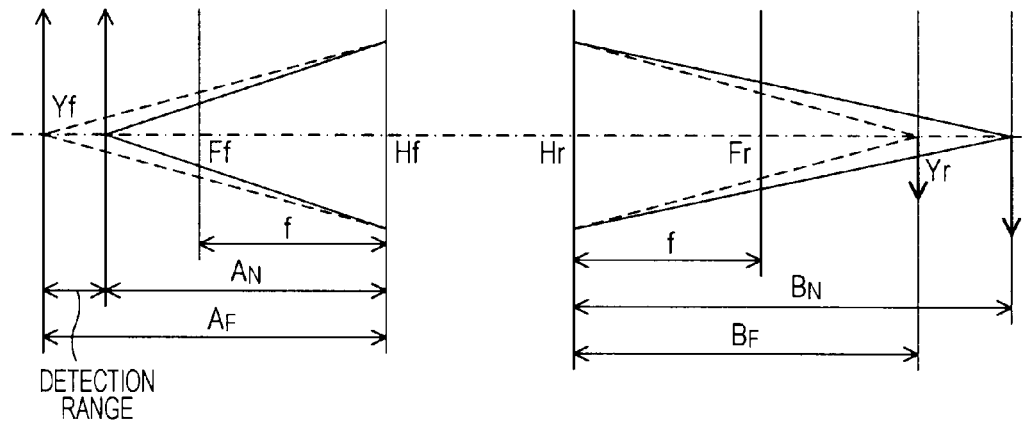
FIGS. 6A and 6B are diagrams illustrating an example of a method of calculating the number of in-detection-range focal depths.

Subsequently, the method of calculating the number of in-detection-range focal depths through the in-detection-range focal depth number calculation section 133 shown in FIG. 4 will be described with reference to FIGS. 6A and 6B. First, FIG. 6A shows the focal length f. Further, FIG. 6A shows the farthest detection range distance $A_F$ and the nearest detection range distance $A_N$. Further, FIG. 6A shows image plane distances $B_F$ and $B_N$ respectively corresponding to the farthest detection range distance $A_F$ and the nearest detection range distance $A_N$.

The focal length f is equal to the distance from the front-side principal point Hf to the front-side focal point Ff, and the distance from the rear-side principal point Hr to the rear-side focal point Fr.

The farthest detection range distance $A_F$ is represented as the distance from the front-side principal point Hf to the subject position Yf. The nearest detection range distance $A_N$ is shorter than the distance from the subject position Yf to the front-side principal point Hf. The image plane distance $B_F$ corresponding to the farthest detection range distance $A_F$ is represented as the distance from the rear-side principal point Hr to the imaging plane Yr. The image plane distance $B_N$ corresponding to the nearest detection range distance $A_N$ is longer than the distance from the imaging plane Yr to the rear-side principal point Hr.

Figure 6B:
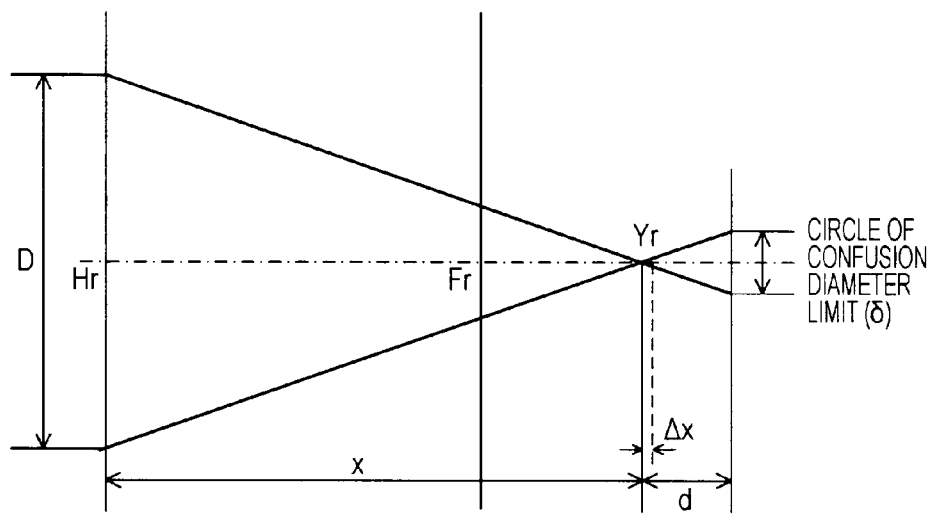

FIG. 6B shows the circle of confusion diameter limit $\delta$. The point light source, which passes through the lens, is in focus on the imaging plane Yr, and is imaged as a point. However, when the image plane becomes far from the imaging plane Yr, the image of the light is formed as a circle. This circle is the circle of confusion, and the maximum circle of confusion, which can be regarded as being in-focus state as viewed by the human eye, is referred to as the maximum permissible circle of confusion. The diameter of the maximum permissible circle of confusion is the circle of confusion diameter limit $\delta$.

The distance from the image plane Yr to the position corresponding to the maximum permissible circle of confusion is referred to as the focal depth d. In addition, the drawing shows the rear-side focal depth which is on the rear side of the image plane Yr relative to the rear-side principal point Hr. However, actually, the front-side focal depth is also present on the front side of the image plane Yr as a reference position. Generally, sometimes, the distance of the front-side focal depth and the distance of the rear-side focal depth are adjusted to each other, and the adjusted distance may be referred to as the focal depth. However, in the embodiment of the invention, for example, only one front-side or rear-side focal depth is treated as the focal depth d.

Then, in the embodiment of the invention, first, at the time of quantifying the detection range, it is assumed that the distance as the focal depth d shown in FIG. 6B is treated as a single unit. Moreover, the detection range is represented by how many focal depths d correspond thereto. That is, the number of focal depths d corresponding to the detection range is represented by the number of in-detection-range focal depths N. The in-detection-range focal depth number calculation section 133 calculates, as described above, the number of in-detection-range focal depths N.

In the embodiment of the invention, the number of in-detection-range focal depths N can be obtained by the following method. In FIG. 6B, the distance from the rear-side principal point Hr to the imaging plane Yr is indicated by x. Regarding the minute variation $\Delta x$ with respect to x, how many focal depths d correspond thereto is calculated. That is, the minute focal depth $\Delta d$, which is the focal depth corresponding to the minute variation $\Delta x$, is calculated. The minute focal depth $\Delta d$ can be obtained, on the basis of the lens diameter D and the circle of confusion diameter limit $\delta$, by the following expression.

Numerical Expression 1

$$\Delta d = \Delta x \div \frac{\delta}{D} x$$
$$= \frac{D \Delta x}{x \delta}$$

That is, the minute focal depth $\Delta d$ is obtained by dividing the minute variation $\Delta x$ by a single focal depth.

Then, the number of in-detection-range focal depths N can be obtained by the following expression. In addition, in the following expression, f represents the focal length, and $\epsilon$ represents the circle of confusion diameter limit.

Numerical Expression 2

$$N = \int_{b_F}^{b_N} \Delta d \, dx$$
$$= \frac{D}{\delta} \int_{\frac{a_F f}{a_F - f}}^{\frac{a_N f}{a_N - f}} \frac{1}{x} dx$$
$$= \frac{D}{\delta} \ln \frac{a_N(a_F - f)}{a_F(a_N - f)}$$

That is, the number of in-detection-range focal depths N can be obtained by integrating the minute focal depth $\Delta d$ in the range from the position corresponding to the image plane distance $B_F$ to the position corresponding to the image plane distance $B_N$.

Further, in the above-mentioned expression, the inverses of the farthest distance $A_F$ and the nearest distance $A_N$ are respectively defined as a $C_F$ and a $C_N$, and thereby the above-mentioned expression can be rewritten as the following expression.

Numerical Expression 3

$$N = \frac{D}{\delta} \ln \frac{1 - c_F f}{1 - c_N f}$$

As can be seen from the above expression, the number of in-detection-range focal depths N can be obtained on the basis of the circle of confusion diameter limit $\delta$, the focal length f, the lens diameter D, and the farthest distance $A_F$ and the nearest distance $A_N$ corresponding to the detection range.

Here, it is preferable that the circle of confusion diameter limit $\delta$ should be acquired by reading the circle-of-confusion diameter limit information 181 stored in the image capturing apparatus 100. The focal length f can be acquired by inputting a value, which is selected from the focal length table 330 in accordance with the current zoom position, from the interchangeable lens 200. Further, the lens diameter D can be obtained by the expression D=f/F based on the focal length f and aperture value F. Accordingly, the information on the focal length f and the current aperture value F is necessary for the calculation of the lens diameter D. However, the aperture value F can also be obtained by inputting a value which is retained as the aperture value information 343 in the interchangeable lens 200.

In addition, as will be described later, in the embodiment of the invention, the detection range, which is determined in accordance with the first focus search, is a range from the position corresponding to the farthest in-focus distance to the position corresponding to the nearest in-focus distance. Accordingly, the initial values of the farthest detection range distance $A_F$ and the nearest detection range distance $A_N$, which are set in accordance with the first focus search, are respectively the farthest in-focus distance and the nearest in-focus distance.

Example of Detection Interval Determination Processing

Next, a description will be given of detection interval determination processing executed by the detection interval determination section 134 of FIG. 4. The detection interval is, as described above, an interval for each detection position in the detection range, and as the detection interval is determined, each detection position is also set. Then, the detection interval, which is determined by the detection interval determination section 134, is not represented by the physical position interval of the focus lens 221, but is represented by the number of focal depths.

The detection interval determination section 134 refers to the detection interval table 182 at the time of determining the detection interval. One specific example of the detection interval table 182 is shown in FIG. 7. In the detection interval table 182 shown in the drawing, the range of the number of in-detection-range focal depths N is classified into (0≤N<20), (20≤N<100), and (N≤100). In addition, it is possible to respectively associate the ranges of the number of in-detection-range focal depths with "5", "15", and "25" as the numbers of in-detection-interval focal depths n.

The detection interval determination section 134 selects, from the detection interval table 182, the number of in-detection-interval focal depths n which can be associated with the number of in-detection-range focal depths N calculated by the in-detection-range focal depth number calculation section 133. For example, the number of in-detection-range focal depths N of "50" is included in the range of (20≤N<100). Therefore, as the number of in-detection-interval focal depths n, "15", which can be associated with the range, is selected. As described above, by selecting the number of in-detection-interval focal depths n, the detection interval is determined. In such a manner, the detection interval determination section 134 changes and sets the detection interval in accordance with the calculated number of in-detection-range focal depths N, that is, the detection range. Thereby, when the detection range is large, by setting a large detection interval, it is possible to reduce the time necessary for the focus search. Further, as the detection range decreases, the setting is made to also decrease the detection interval, whereby it is possible to obtain the evaluated value with high accuracy.

Instruction of Focus Lens Shift Corresponding to Focus Search

Next, a description will be given of an operation example for the instruction of the focus lens shift which is executed in accordance with the focus search by the focus lens shift instruction section 135. When the detection interval determined by the detection interval determination section 134, that is, the number of in-detection-interval focal depths is input, the focus lens shift instruction section 135 generates, for example, a focus search command 400 shown in FIG. 8A, and transmits the command to the interchangeable lens 200.

Figure 8A:
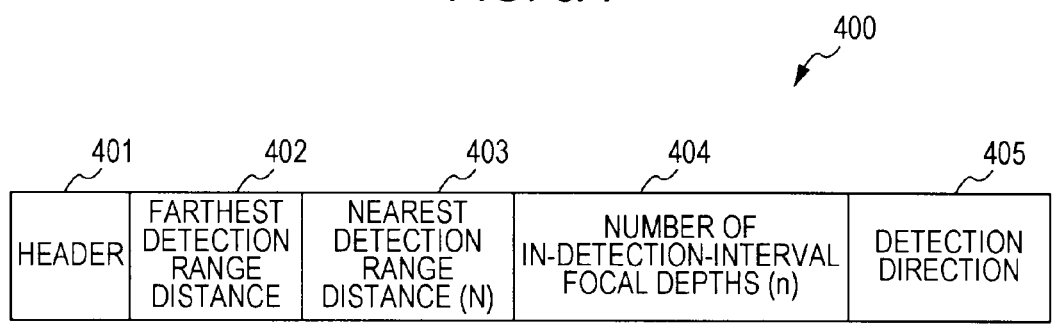
FIGS. 8A and 8B diagrams illustrating exemplary structures of focus search commands.
Figure 8B:
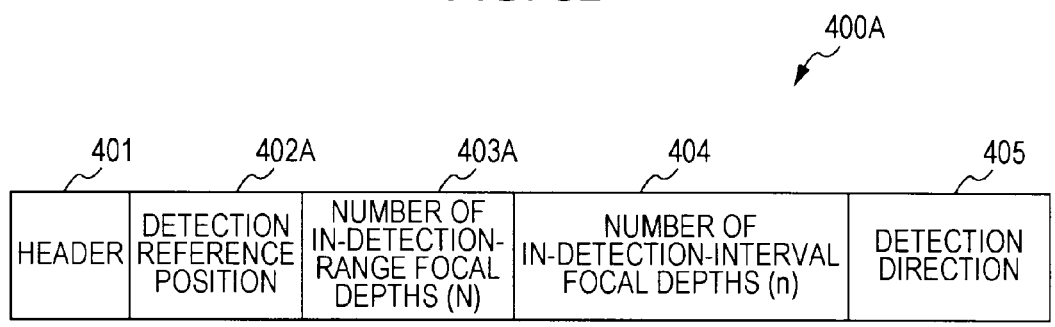

In addition, a focus search command 400A shown in FIG. 8B is a modified example which will be described later.

The focus search command 400 is formed to successively contain, for example, a header 401, the farthest detection range distance 402, the nearest detection range distance 403, the number of in-detection-interval focal depths 404, and a detection direction 405.

In the farthest detection range distance 402 and the nearest detection range distance 403, values of the farthest detection range distance $A_F$ and the nearest detection range distance $A_N$, which correspond to the detection range determined by the detection range determination section 132, are respectively stored. On the basis of the farthest detection range distance 402 and the nearest detection range distance 403, the detection range is specified.

In the number of in-detection-interval focal depths 404, a value, which represents the number of in-detection-interval focal depths n determined by the detection interval determination section 134, is stored. In the detection direction 405, a value, which represents the direction of shifting the focus lens in the focus search, is stored.

The focus lens shift instruction section 135 instructs the interchangeable lens 200 to execute the focus search operation by transmitting the focus search command 400 based on the above structure.

Example of Processing of Calculating Amount of Lens Shift Corresponding to Detection Interval Next, a description will be given of an example of process of calculating an amount of lens shift Mv of the focus lens 221 corresponding to the detection interval, the process being executed by the focus lens shift calculation section 251 in the interchangeable lens 200.

In the interchangeable lens 200, the focus search command 400 is input by the focus lens shift calculation section 251. The focus lens shift calculation section 251 calculates the amount of lens shift Mv, thereby acquiring the focus sensitivity $\epsilon$ corresponding to the current state of the optical system from the focus sensitivity table 310.

Figure 9:
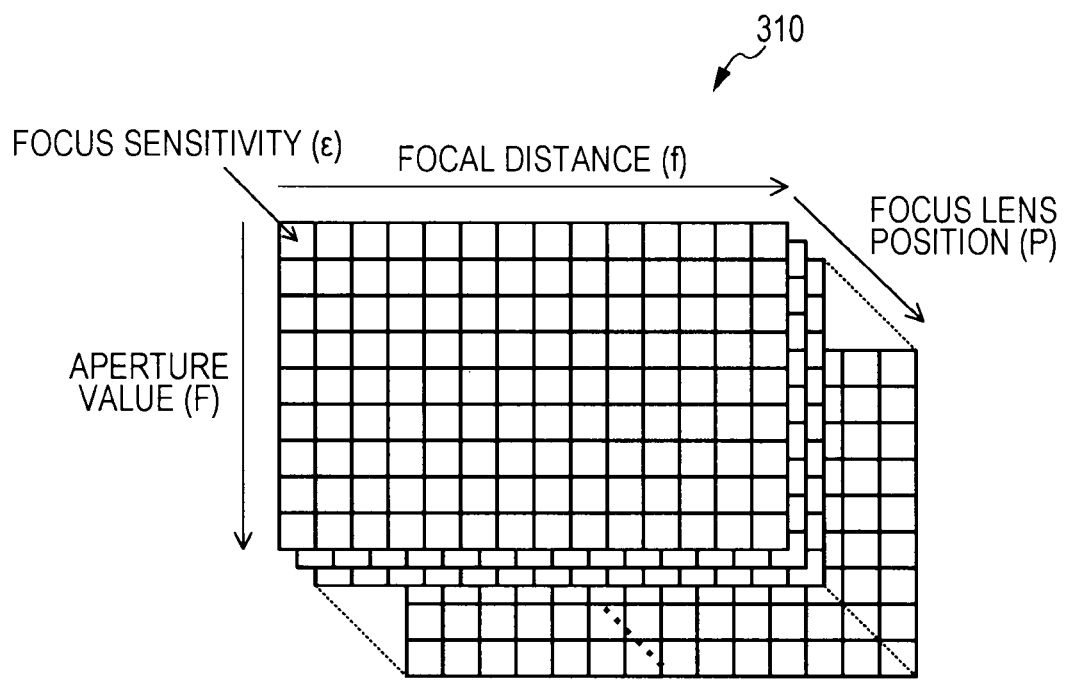
FIG. 9 is a diagram illustrating an exemplary structure of a focus sensitivity table.

FIG. 9 shows an exemplary structure of the focus sensitivity table 310. As shown in the drawing, the focus sensitivity table 310 has the structure of a 3D table in which one focus sensitivity $\epsilon$ is contained for each combination of the focal length f, the aperture value F and the focus lens position P.

The focus sensitivity $\epsilon$ represents the ratio of the amount of shift of the imaging plane (the imaging position) to the physical amount of shift of the focus lens. As a specific example, when the focus lens is shift from a certain lens position in the direction of the optical axis by 10 μm, the amount of shift of the imaging plane is 1 μm. In this case, the focus sensitivity $\epsilon$ is "0.1". That is, the focus sensitivity $\epsilon$ is represented by the expression that $\epsilon$=the amount of shift of the imaging plane/the amount of shift of the focus lens.

The focus sensitivity $\epsilon$ is changed in accordance with the focal length f. Further, the focus sensitivity $\epsilon$ is changed in accordance with the aperture value F. Moreover, the focus sensitivity $\epsilon$ is changed in accordance with the focus lens position P. That is, a single value of the focus sensitivity $\epsilon$ depends on the combination of the focal length f, the aperture value F, and the focus lens position P as the current state of the optical system. On the basis of this, the focus sensitivity table 310 has a 3D table structure shown in FIG. 9.

Then, the focus lens shift calculation section 251 inputs the focal length f in order to obtain the focus sensitivity $\epsilon$. The focal length f is a value which is selected by the reference table section 253 from the focal length table 330 on the basis of the zoom position Z indicated by the zoom position information 341. Further, the value retained as the aperture value information 343 is input as the aperture value F. Further, the value retained as the focus lens position information 342 is input as the focus lens position P. Then, from the focus sensitivity table 310, the value of the single focus sensitivity $\epsilon$ corresponding to the input combination of the focal length f, the aperture value F, and the focus lens position P.

Next, the focus lens shift calculation section 251 calculates the physical amount of lens shift Mv of the focus lens 221 corresponding to the number of in-detection-interval focal depths n. The amount of lens shift Mv is obtained, on the basis of the effective aperture value Fe, the circle of confusion diameter limit δ, the focus sensitivity $\epsilon$, and the number of in-detection-interval focal depths n, by the following expression.

$$Mv=((Fe \cdot \delta)/\epsilon)n$$

The circle of confusion diameter limit δ is acquired, as described above, by receiving the value, which is stored as the circle-of-confusion diameter limit information 181, from the image capturing apparatus 100. Further, the effective aperture value Fe is an aperture value corresponding to the case where an object is located at a finite distance, and is changed in accordance with, for example, the focus lens position P. The effective aperture value Fe corresponding to the focus lens position P can be obtained by calculation.

In addition, in the above expression for calculating the amount of lens shift Mv, the term (Fe·δ) represents the focal depth d which can be obtained at the current imaging position. In addition, the term ((Fe·δ)/$\epsilon$) represents the physical amount of shift of the focus lens necessary to shift the image plane by the focal depth d (by a single focal depth). Accordingly, the amount of lens shift Mv represents the physical amount of shift of the focus lens necessary to shift the image plane from the current imaging position by the number of focal depths n. As described above, the focus lens shift calculation section 251 converts the number of in-detection-interval focal depths n into the physical amount of shift of the focus lens.

The focus lens shift calculation section 251 outputs the amount of lens shift Mv, which is calculated as described above, to the focus lens drive control section 252. The focus lens drive control section 252 performs the control for shifting the focus lens 221 by the amount of lens shift Mv only in the designated detection direction. Thereby, the focus lens 221 is shifted to the next detection position at a distance, which corresponds to the number of focal depths n, away from the current detection position.

The focus lens drive control section 252 shifts the focus lens 221 by the amount of lens shift Mv which is newly calculated as described above. Thereby, the focus lens 221 is shifted to the next focus lens position (the detection position) at a distance corresponding to the number of in-detection-interval focal depths n away from the current focus lens position (the detection position).

In addition, the amount of lens shift Mv can be more accurately obtained. That is, first, the amount of shift of the focus lens Mv1 necessary to shift the image plane by the focal depth d corresponding to the current focus lens position P0 is obtained. Next, the shift amount Mv2 is obtained at the focus lens position P1 to which the focus lens is shifted from the focus lens position P0 by the shift amount Mv1. Thereafter, likewise, the amount of shift of the focus lens Mvn, which is necessary to shift the image plane by the focal depth d at the position to which the focus lens is shifted by a single focal depth each time, is calculated, and this calculation is repeated the number of times corresponding to the number of in-detection-interval focal depths n. Thereby, it is possible to obtain n shift amounts Mv1 to Mvn corresponding to the number of in-detection-interval focal depths n. Then, by adding such shift amounts Mv1 to Mvn, the amount of lens shift Mv corresponding to the number of in-detection-interval focal depths n is obtained. However, in such a method of calculating the amount of lens shift Mv, the calculation amount increases, and thus the processing load increases. For this reason, in the embodiment of the invention, in consideration of satisfying both of an appropriate calculation amount and the calculation accuracy of the amount of lens shift Mv sufficient in practice, the amount of lens shift Mv is obtained on the basis of the above-described expression.

Example of Processing Procedure in Image Capturing Apparatus

Figure 10:
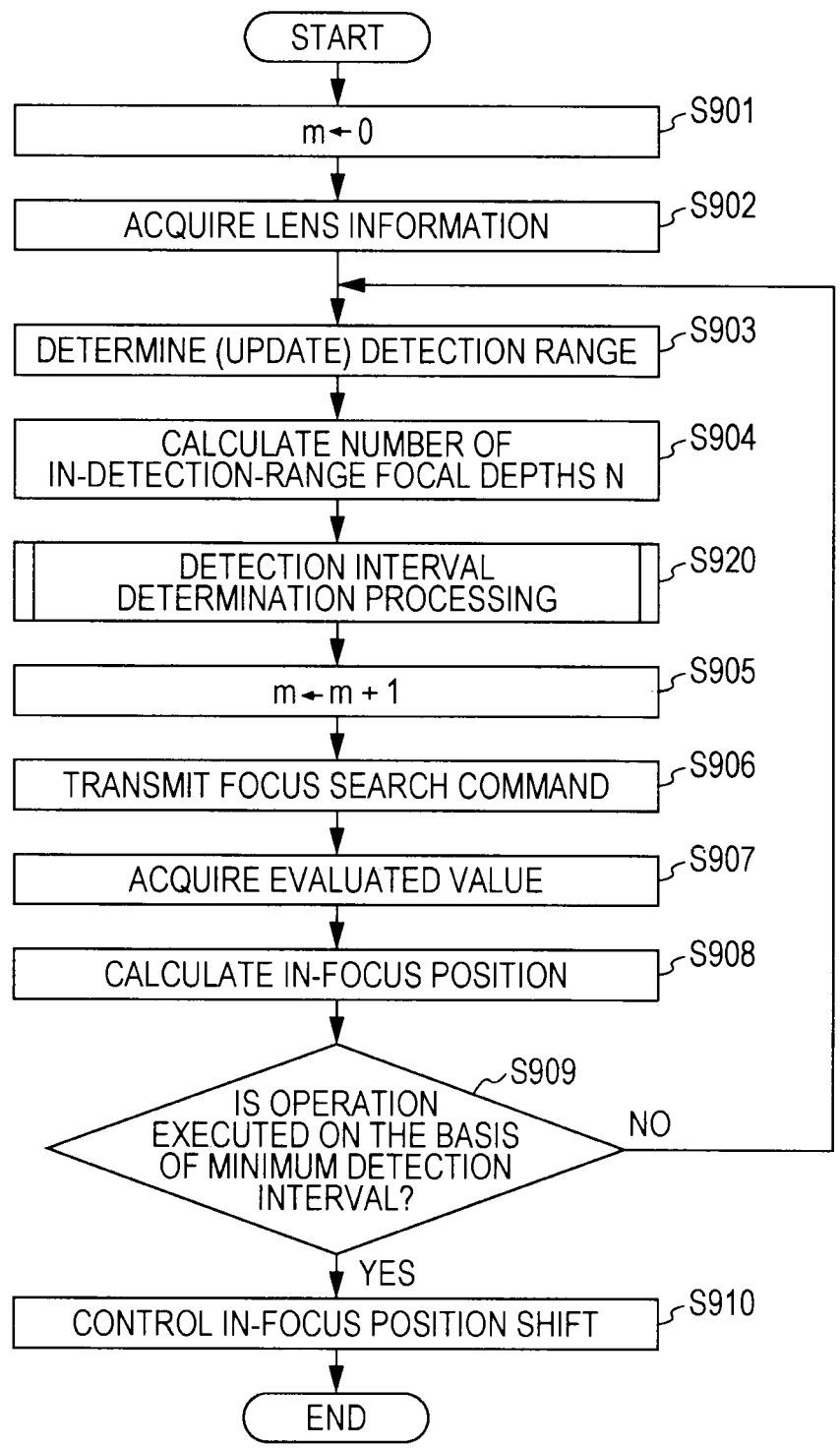
FIG. 10 is a diagram illustrating an example of a procedure of a process for autofocus control executed by the image capturing apparatus.

The flowchart of FIG. 10 shows an exemplary procedure of processing for the autofocus control executed by the image capturing apparatus 100 shown in FIG. 4. The process in each step shown in the drawing is appropriately executed by any one of the functional blocks of the image capturing apparatus 100 shown in FIG. 4.

At the start of the autofocus control based on the contrast mode, for example, the in-detection-range focal depth number calculation section 133 assigns an initial value of 0 to a variable m representing the number of times the focus search operation is executed (step S901). Next, the in-detection-range focal depth number calculation section 133 acquires the lens information from the interchangeable lens 200. The lens information described herein is information used in the calculation of the number of in-detection-range focal depths N, and as described above, includes the focal length f, the in-focus distance (the farthest in-focus distance and the nearest in-focus distance), and the aperture value F.

Subsequently, the detection range determination section 132 executes the process of determining the detection range (step S903). Here, in step S903 corresponding to first focus search, the range, which corresponds to the farthest in-focus distance and the nearest in-focus distance acquired in step S902, is determined as the detection range.

Next, the in-detection-range focal depth number calculation section 133 executes the process of calculating the number of in-detection-range focal depths N corresponding to the detection range which is determined in step S903 described above (step S904). Then, the detection interval determination section 134 determines the detection interval corresponding to the number of in-detection-range focal depths N which is calculated in step S904 described above (step S920). Although the process of determining the detection interval in step S920 will be described later with reference to FIG. 13, the determined detection interval is represented as the number of in-detection-interval focal depths n. For example, in this step, the in-detection-range focal depth number calculation section 133 adds an increment to the variable m (step S905).

Next, the focus lens shift instruction section 135 generates, for example, the focus search command 400 shown in FIG. 8A, and transmits the command to the interchangeable lens 200 (step S906). The focus lens shift instruction section 135 stores the value of the number of in-detection-interval focal depths n, which is determined in step S920 described above, as the number of in-detection-interval focal depths 404 at the time of generating the focus search command 400. Further, the values of the farthest detection range distance and the nearest detection range distance corresponding to the detection range, which is determined (renewed) in step S903, as the farthest detection range distance 402 and nearest detection range distance 403.

In response to the transmission of the focus search command 400, the interchangeable lens 200 executes, as will be described later, the operation for shifting the focus lens 221 in accordance of a single focus search. That is, the focus lens 221 is sequentially shifted to the detection positions in the detection range. Accordingly, the detection section 170 calculates the evaluated value from the image signal which is input for each detection position (step S907). Then, after the focus lens 221 reaches the detection end position, the in-focus position is calculated on the basis of the evaluated value obtained for each detection position passed hitherto (step S908).

Next, for example, the focus lens shift instruction section 135 determines whether or not the operation of the current focus search is based on the minimum detection interval (step S909). The minimum detection interval corresponds to the minimum of the number of in-detection-interval focal depths n which can be determined. Specifically, on the basis of the detection interval table 182 shown in FIG. 7, the number of in-detection-interval focal depths n corresponding to the minimum detection interval is "15".

First, if it is determined in step S909 that the focus search based on the detection interval which is larger than the minimum detection interval, the process from step S903 is executed again. That is, the focus search is executed again. However, in and after the second focus search, the detection range determination section 132 executes the following process as step S903. That is, the in-focus position, which is calculated in step S908 on the basis of the previous focus search, is set as a reference (the center) of the detection range. In addition, the detection range is set to be smaller than the previous detection range. According to this, as the focus search is repeated again and again, it is possible to stepwise decrease even the detection interval which is determined by the detection interval determination process of step S920.

Then, when it was possible to obtain the determination result that the focus search is executed on the basis of the minimum detection interval in step S909, the in-focus position is calculated at highest accuracy. Accordingly, no further focus search is necessary. Therefore, in this case, the instruction is given to the interchangeable lens 200 so as to shift the focus lens to the in-focus position, which is calculated through the final in-focus position calculation process (step S908), (step S910). In response to the instruction, in the interchangeable lens 200, lens drive to shift the focus lens 221 to the designated in-focus position is performed. As a result, it is possible to obtain a state in which the subject is in focus.

Figure 11:
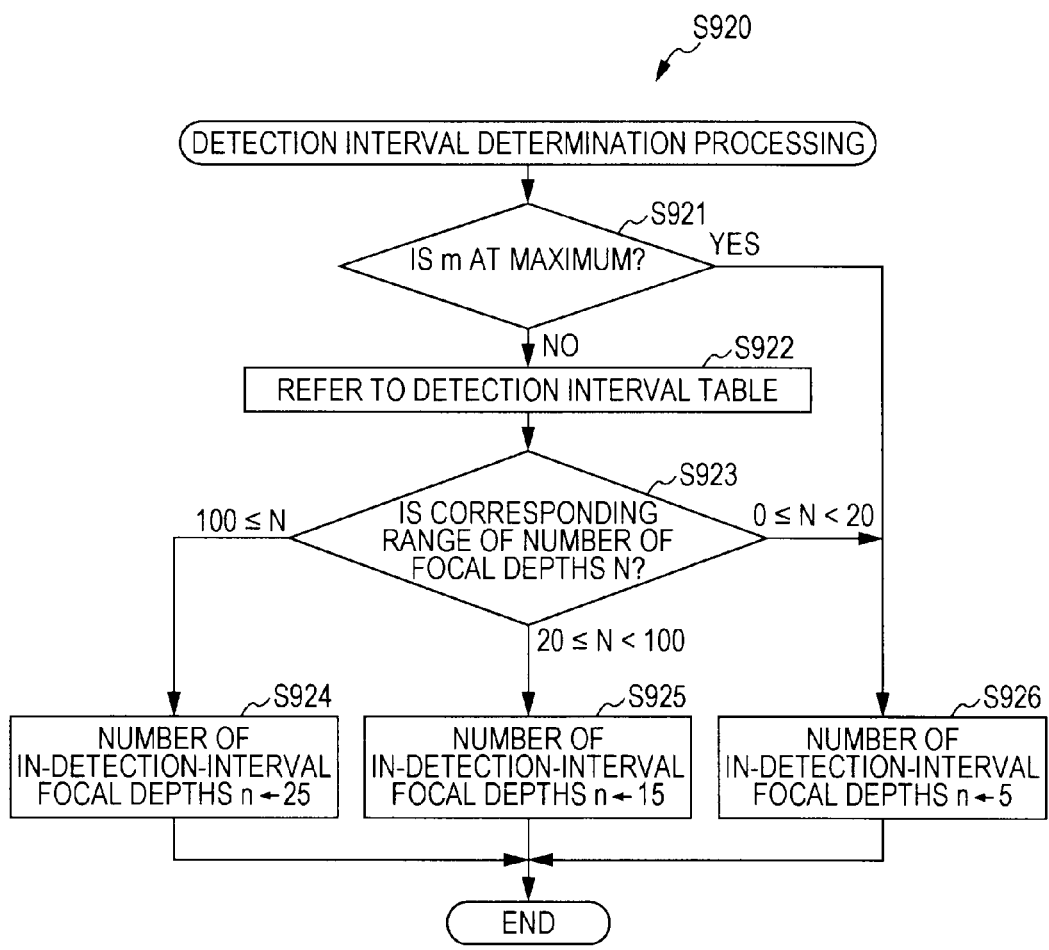
FIG. 11 is a diagram illustrating an example of a procedure of a detection interval determination process executed by the image capturing apparatus.

The flowchart of FIG. 11 shows an exemplary procedure of the detection interval determination process indicated in step S920 of FIG. 10. In addition, in the description of the process shown in the drawing, it is the premise that the detection interval table 182 has contents shown in FIG. 7.

First, the detection interval determination section 134 determines whether or not the current variable m is the maximum value (step S921). As described above, in the embodiment of the invention, by repeatedly performing the focus search, finally, the final focus search is executed on the basis of the minimum detection interval. However, due to some factors, there is a possibility of an operation state occurring in which it is difficult to set the minimum detection interval even when the focus search is executed a certain number of times or more which is originally sufficient to set the minimum detection interval. Accordingly, in the embodiment of the invention, in order to cope with such an abnormal operation, a restriction is imposed on the number of times the focus search is executed in the following manner.

If it is determined in step S902 that the current variable m is the maximum value, even when the focus search is executed a certain number of times or more, the minimum detection interval is not yet set. Therefore, in this case, the detection interval determination section 134 sets the number of in-detection-interval focal depths n to "5" through the detection interval determination process (step S926). Thereby, at the end stage of the focus search currently executed, in step S909 of FIG. 10, it is determined that the focus search is executed on the basis of the minimum detection interval. That is, the current focus search is regarded as the final focus search. As described above, in the embodiment of the invention, the restriction is imposed on the number of times the focus search is executed. Thereby, the focus search is uselessly repeated a certain number of times or more, and thus it is possible to make the maximum time necessary for the focus control be within a certain range.

In contrast, if it is determined in step S921 that the variable m is not the maximum value, normal detection interval determination process is executed. Hence, the detection interval determination section 134 refers to the detection interval table 182 (step S922). Then, it is determined which one of the range divisions divided in the detection interval table 182 corresponds to the number of in-detection-range focal depths N referenced in step S904 of FIG. 10 (step S923). From the determination result, if the number corresponds to the range division of N≤100, the variable n representing the number of in-detection-interval focal depths is set to "25" (step S924). Further, if the number corresponds to the range division of 20≤N<100, the number of in-detection-interval focal depths n is set to "15" (step S925). Further, if the number corresponds to the range division of 0≤N<20, the number of in-detection-interval focal depths n is set to "5". In such a manner, in the embodiment of the invention, on the basis of the detection range represented by the number of focal depths, the detection interval represented by the number of focal depths is set (step S925). Through the process from step S924 to step S926, the detection interval is set.

Example of Processing Procedure in Interchangeable Lens

Figure 12:
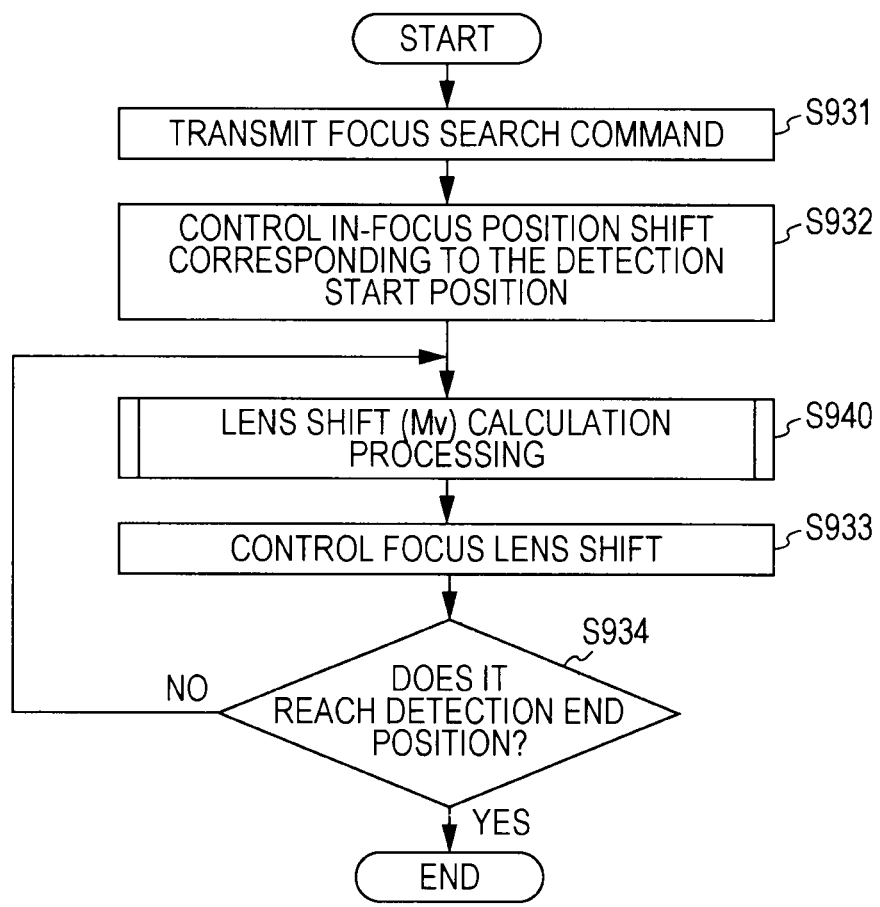
FIG. 12 is a diagram illustrating an example of a procedure of a process executed by an interchangeable lens in response to reception of the focus search command.

The flowchart of FIG. 12 shows an exemplary procedure of processing which is executed by the interchangeable lens 200 in response to receiving the focus search command 400. In addition, the process shown in the drawing is appropriately executed by any one of the functional blocks in the interchangeable lens 200 shown in FIG. 4.

The focus search command 400, which is transmitted from the focus lens shift instruction section 135 of the image capturing apparatus 100, is received by the focus lens shift calculation section 251 in the interchangeable lens 200 (step S931).

In response to receiving the focus search command 400, first, the control for shifting the focus lens 221 to the detection start position is executed (step S932). Hence, the focus lens shift calculation section 251 refers to information contained in the focus search command 400. That is, when the detection direction 405 represents the direction from the farthest detection range distance to the nearest detection range distance, the farthest detection range distance 402 is determined as the detection start position. On the other hand, when the detection direction 405 represents the direction from the nearest detection range distance to the farthest detection range distance, the nearest detection range distance 403 is determined as the detection start position. Then, the instruction of the focus lens drive for the determined detection start position is given to the focus lens drive control section 252. In accordance with the instruction, the focus lens drive control section 252 executes the drive control, and thereby the focus lens 221 is shifted to the detection start position.

Next, the focus lens shift calculation section 251 executes the amount of shift of the focus lens calculation process corresponding to the detection interval (step S940). The lens shift calculation process is described in step S940.

Next, the control for shifting the focus lens is executed on the basis of the amount of lens shift Mv calculated in step S940 (step S933). Hence, the focus lens shift calculation section 251 instructs the focus lens drive control section 252 to shift the focus lens 221 by the amount of lens shift Mv which is calculated in step S940. In accordance with the instruction, the focus lens 221 is shifted to the detection position at a distance of the amount of lens shift Mv away from the current detection position.

Next, as the result that the focus lens 221 is shifted in step S933 described above, the focus lens shift calculation section 251 determines whether or not the focus lens position reaches the detection end position (step S934). The detection end position is one, which is not determined as the detection start position, in the farthest detection range distance 402 and the nearest detection range distance 403 in the focus search command 400. The focus lens shift calculation section 251 compares the current focus lens position with the detection end position. Then, if it is possible to obtain the comparison result that the current focus lens position is the same as the detection end position or is beyond the detection end position, it is determined that the focus lens position reaches the detection end position. In contrast, if it is possible to obtain the comparison result that the current focus lens position is not beyond the detection end position, it is determined that the focus lens position does not reach the detection end position.

In step S934, if it is determined that the focus lens position does not reach the detection end position, the amount of lens shift Mv corresponding to the current focus lens position P is newly calculated (step S940). Next, the focus lens shift control based on the calculated amount of lens shift Mv is executed (step S933). As described above, as the result that the process of steps S940 and S933 is repeatedly executed, when it is determined in step S934 that the focus lens position reaches the detection end position, the focus lens shift control, which is performed hitherto in response to receiving the focus search command 400, is terminated.

Figure 13:
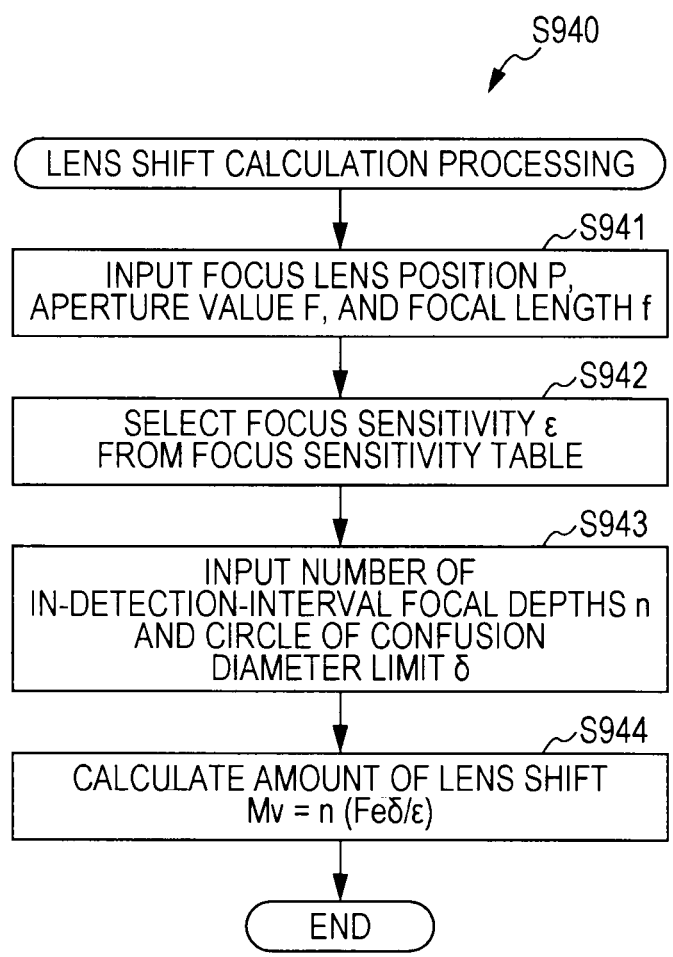
FIG. 13 is a diagram illustrating an example of a procedure of a lens shift calculation process corresponding to the detection interval executed by the interchangeable lens.

The flowchart of FIG. 13 shows an exemplary procedure of processing of lens shift calculation corresponding to the detection interval in step S940 shown in FIG. 12 described above. The focus lens shift calculation section 251 inputs the focus lens position P, the aperture value F and the focal length f (step S941). Next, the focus lens shift calculation section 251 selects, from the focus sensitivity table 310, the focus sensitivity ϵ corresponding to the combination of the focus lens position P, the aperture value F, and the focal length f, which are input in step S941 described above, (step S942).

Further, the focus lens shift calculation section 251 inputs the values of the number of in-detection-interval focal depths n and the circle of confusion diameter limit δ (step S943). As the number of in-detection-interval focal depths n, the value, which is contained in the number of in-detection-interval focal depths 404 in the received focus search command 400, is input. Further, as the circle of confusion diameter limit δ, the value, which is stored as the circle-of-confusion diameter limit information 181 in the image capturing apparatus 100, is input. In addition, for example, the value of the circle of confusion diameter limit δ, which is first transmitted from the image capturing apparatus 100 at a predetermined timing, is retained in the interchangeable lens 200 side, and in step S943, the retained value may be input.

Further, among the focus lens position P, the aperture value F, and the focal length f which are input in step S943, the aperture value F and the focal length f are fixed for a single focus search operation. Therefore, in the single focus search, at the first time in step S943, the focus lens position P, the aperture value F, and the focal length f are input. Then, at the second time and thereafter, only the focus lens position P may be newly input.

Then, the focus lens shift calculation section 251 calculates the amount of lens shift Mv as described above on the basis of the circle of confusion diameter limit δ and the focus sensitivity ε, which are input as described above, and the effective aperture value Fe corresponding to the focus lens position P (step S944).

First, according to the procedure shown in FIG. 12, in the single focus search, by executing step S940 whenever shifting the focus lens 221 for each detection interval, a new amount of lens shift My is obtained. This is based on the change in the focal depth d (the effective aperture value Fe) and the focus sensitivity ε according to the position of the focus lens 221. As described above, the amount of lens shift Mv is calculated on the basis of the focal depth d (Fe·δ), the focus sensitivity ε, and the number of in-detection-interval focal depths n. Therefore, in accordance with step S940 of FIG. 12, whenever the focus lens 221 is shifted, a new focal depth d corresponding to a new focus lens position P after the shift is calculated, and a new focus sensitivity ε is acquired. Then, on the basis of the new focal depth d and focus sensitivity ε, the amount of lens shift Mv corresponding to the new focus lens position P is calculated. Through the procedure, in the embodiment of the invention, regardless of the shift of the focus lens position, the amount of change in contrast is made to be a constant value corresponding to the number of focal depths n, whereby it is possible to shift the focus lens for each detection interval.

Further, generally, at the time of driving the focus lens, the image capturing apparatus specify the physical shift amount, and gives an instruction to drive the focus lens. In this configuration under the image capturing system 10 shown in FIG. 1, first, the amount of lens shift Mv in the image capturing apparatus 100 is calculated. Then, by specifying the amount of lens shift Mv, the instruction to shift the focus lens 221 is given to the interchangeable lens 200.

However, with such a configuration, in order to calculate the amount of lens shift Mv of the focus lens 221, the data of the focus sensitivity table 310 is necessary for the image capturing apparatus 100. Alternately, as the information which is substituted for the focus sensitivity table 310, for example, information representing the focal depth for each focus position in the entire focus shift range is necessary. Such information has a value which is unique for each lens unit. Accordingly, it is preferable to store the information in the interchangeable lens 200, but in practice, it is not preferable to store the information in the image capturing apparatus 100 in which it is assumed that the lens is interchangeable. Accordingly, when the image capturing apparatus 100 is intended to calculate the physical amount of lens shift from the number of in-detection-interval focal depths n, the communication for inputting the focus sensitivity table 310 from the interchangeable lens 200 is performed. The focus sensitivity table 310 has a 3D table structure as shown in FIG. 9, and the data size is considerably large. Hence, the communication processing load increases, and thus the speed of the autofocus control decreases.

Therefore, in the embodiment of the invention, from the image capturing apparatus 100 side, the instruction to shift the focus lens 221 is issued on the based on the number of in-detection-interval focal depths n, thereby obtaining the amount of lens shift Mv corresponding to the number of in-detection-interval focal depths n in the interchangeable lens 200. Thereby, it becomes unnecessary to transmit or receive the focus sensitivity table 310 or information with a large data size substituted therefor between the image capturing apparatus 100 and the interchangeable lens 200. For example, as described above, for the autofocus control in the embodiment of the invention, the information, which is input from the interchangeable lens 200 to the image capturing apparatus 100, includes the focal length f, the nearest in-focus distance, the farthest in-focus distance, and the aperture value F. When such information is transmitted and received, it is possible to considerably reduce the communication load.

MODIFIED EXAMPLES

Subsequently, modified examples according to the embodiment of the invention will be described. In the first embodiment, the detection range, which is updated in step S903 of FIG. 10 in and after the second focus search, is represented by the farthest detection range distance and the nearest detection range distance. That is, on the basis of the physical distance relative to the lens (the principal point), the detection range is determined.

In contrast, in the modified example, the detection range, which is updated in step S903, is represented by the number of focal depths N. In this case, step S903 in and after the second focus search is the following process. That is, in the number of in-detection-range focal depths N representing the detection range which is set at the previous focus search, a value of the number of in-detection-range focal depths N which is smaller than the above is set in accordance with, for example, a prescribed algorithm. In such a manner, in step S903 in and after the second focus search, the new number of in-detection-range focal depths N is obtained by updating the detection range. Hence, it is possible to omit the process in step S904. In addition, it is preferable that the detection interval determination process in step S920 should be executed in the procedure shown in FIG. 11 similar to the first embodiment on the basis of the number of in-detection-range focal depths N corresponding to the newly updated detection range.

According to the modified example, the focus search command 400A transmitted in step S906 of FIG. 10 is shown in FIG. 8B. The focus search command 400A shown in the drawing contains, instead of the farthest detection range distance 402 and the nearest detection range distance 403 contained in the focus search command 400 of FIG. 8A, the detection reference position 402A and the number of in-detection-range focal depths (N).

The detection reference position 402A, that is, the reference position representing the position which is a reference in the updated detection range may be set as, for example, the detection start position. Alternately, the reference position may be set as the center position (the in-focus position calculated in step S908) in the detection range. The number of in-detection-range focal depths 403A contains the value (N) which is obtained when the detection range updated in the current focus search is represented by the number of focal depths.

In the interchangeable lens 200 which receives the focus search command 400A, the drive control of the focus lens 221 is executed in a procedure of the process as described in FIGS. 12 and 13. However, in step S932, for example, the position, which is indicated by the detection reference position 402A in the focus search command 400A, is set as the detection start position, and the focus lens 221 is shifted. Further, the determination as to whether or not the focus lens position reaches the detection end position in step S934 may be not based on an actual position of the focus lens, but may be determined in the following method. That is, the shift of the focus lens 221 based on the amount of lens shift Mv can be determined on the basis of whether or not the shift is repeated the number of times necessary therefor. The necessary number of times can be obtained, on the basis of for example the number of in-detection-range focal depths N and the number of in-detection-interval focal depths n, in terms of (N/n). In such a manner, in the modified example, the value of the number of in-detection-range focal depths N is changed in the detection range, thereby performing the update. In addition, as described above, in and after the second focus search, it is possible to omit the process for calculating the number of in-detection-range focal depths N for each updated detection range. Thereby, it is possible to reduce the processing load on the image capturing apparatus 100 side.

In addition, the configuration according to the embodiment of the invention can also be applied to, for example, an image capturing apparatus in which the lens and the main body are integrated. In this case, the data corresponding to the focus sensitivity table 310 may not be transmitted and received between the lens unit side and the main body side of the image capturing apparatus, whereby it is possible to reduce the processing load on the autofocus control.

Further, the embodiment of the invention shows an example for embodying the invention, and as clarified in the embodiment of the invention, the matters in the embodiment of the invention respectively correspond to the specific matters in claims. Likewise, the specific matters in claims respectively correspond to the matters, which are referenced by the same names, in the embodiment of the invention. However, the invention is not limited to the embodiment, and may be embodied by modifying the embodiment into various forms without departing from the scope of the invention.

Further, the processing procedures described in the embodiment of the invention may be understood as a method having a series of the procedures, and may be understood as a program for causing a computer to execute the series of the procedures or a recording medium storing the program. Examples of the recording medium include, for example, a CD (Compact Disc), an MD (MiniDisc), a DVD (Digital Versatile Disc), a memory card, a Blu-ray disc (BD (registered trademark)), and the like.

The present application contains subject matter related to that disclosed in Japanese Priority Patent Application JP 2010-122169 filed in the Japan Patent Office on May 28, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A focus control device comprising:
in-detection-range focal depth number calculation circuitry that calculates a number of in-detection-range focal depths as a number of focal depths, which are divided as division units and each of which is based on a corresponding position of a focus lens, in accordance with a detection range in which the focus lens is shifted to detect a contrast of a captured image signal;
detection interval determination circuitry that determines a number of in-detection-interval focal depths, which represents the number of focal depths as the division units, as a detection interval in the detection range, based on the calculated number of in-detection-range focal depths as compared to a plurality of predetermined ranges of in-detection-range focal depths of a detection interval table stored in memory; and
focus lens shift instruction circuitry that instructs lens circuitry to perform a focus search which shifts the focus lens by specifying the detection range and the number of in-detection-interval focal depths determined as the detection interval.

2. The focus control device according to claim 1, wherein the in-detection-range focal depth number calculation circuitry calculates the number of in-detection-range focal depths based on an aperture value which is input from the lens circuitry, a focal length which is input from the lens circuitry, a circle of confusion diameter limit which is stored in the corresponding focus control device, and a farthest distance and a nearest distance from and to, respectively, a principal point corresponding to the detection range.

3. The focus control device according to claim 1, further comprising detection range determination circuitry that, as a single operation of the focus search is completed, newly determines the detection range for the focus search,
wherein the detection interval determination circuitry determines, based on the determined detection range, the number of in-detection-interval focal depths associated with the detection range.

4. The focus control device according to claim 1, wherein, when the number of in-detection-interval focal depths determined as the detection interval is a predetermined minimum number, the focus lens shift instruction circuitry instructs the lens circuitry to perform a final focus search by specifying a minimum number of in-detection-interval focal depths, and instructs the lens circuitry to shift the focus lens to an in-focus position, calculated based on a contrast detected through the final focus search.

5. The focus control device according to claim 1, wherein the detection interval determination circuitry selects the number of in-detection-interval focal depths, which can be associated with the calculated number of in-detection-range focal depths, based on detection interval information in which the in-detection-range focal depths are associated with the in-detection-interval focal depths, to determine the number of in-detection-interval focal depths corresponding to the detection interval.

6. The focus control device according to claim 1, further comprising communication circuitry that communicates with the lens circuitry in a state where the lens circuitry is removably coupled to a main body of the focus control device.

7. The focus control device according to claim 1, further comprising circuitry configured to store a reference table including:

an in-focus distance table portion in which combinations of in-focus distances, which include a nearest in-focus distance and a farthest in-focus distance, are associated with corresponding zoom positions; and a focal length table portion in which focal lengths of the focus control device are associated with corresponding zoom positions.

8. The focus control device according to claim 1, wherein the detection interval table includes non-overlapping ranges of the in-detection-range focal depths corresponding to respective numbers of in-detection interval focal depths, the number of in-detection interval focal depths of the detection interval table increasing in correspondence with increasing different values of the respective non-overlapping ranges of the in-detection-range focal depths of the detection interval table.

9. The focus control device according to claim 8,
wherein the non-overlapping ranges of the in-detection-range focal depths (N) include first, second, and third non-overlapping ranges, and
wherein:
for the first range, the number of in-detection range focal depths (N) is 0≤N<20, and the number of in-detection interval focal depths (n) is five,
for the second range, the number of in-detection range focal depths (N) is 20≤N<100, and the number of in-detection interval focal depths (n) is fifteen, and
for the third range, the number of in-detection range focal depths (N) is 100≤N, and the number of in-detection interval focal depths (n) is twenty-five.

10. A lens system comprising:
communication circuitry that communicates with a main body of an image capturing apparatus in a state where the communication circuitry is mounted to the main body of the image capturing apparatus;
focus lens shift calculation circuitry that calculates a number of focal depths, which represents a detection interval, as an amount of shift of a focus lens in response to receiving an instruction to shift the focus lens from the main body of the image capturing apparatus, by specifying a detection range, in which the focus lens is shifted to detect a contrast of a captured image signal, and the detection interval represented by the number of focal depths which are division units of the detection range and each of which is based on a corresponding position of the focus lens; and
focus lens drive control circuitry that shifts the focus lens based on the calculated number of focal depths as the amount of shift of the focus lens.

11. The lens system according to claim 10, wherein the focus lens shift calculation circuitry calculates the number of focal depths as the amount of shift of the focus lens based on a focus sensitivity which is specified based on a focus lens position, an aperture value, a focal length, a circle of confusion diameter limit which is input from the main body of the image capturing apparatus, and the number of focal depths which represents the detection interval.

12. The lens system according to claim 10, wherein the focal depths increase in value in correspondence with non-overlapping focus lens positions which are respective increasing distances away from a first focus lens position.

13. The lens system according to claim 10, wherein the detection interval is constant.

14. The lens system according to claim 11, wherein, whenever the focus lens is shifted to a new position based on the calculated number of focal depths as the amount of shift of the focus lens, the focus lens shift calculation circuitry calculates an amount of shift of the focus lens corresponding to the new position.

15. A focus control method comprising:
calculating, using processing circuitry, a number of in-detection-range focal depths as a number of focal depths, which are divided as division units and each of which is based on a corresponding position of a focus lens, in accordance with a detection range in which the focus lens is shifted to detect a contrast of a captured image signal;
determining, using the processing circuitry, a number of in-detection-interval focal depths, which represents the number of focal depths as the division units, as a detection interval in a detection range, based on the calculated number of in-detection-range focal depths as compared to a plurality of predetermined ranges of in-detection-range focal depths of a detection interval table stored in memory; and
instructing, using the processing circuitry, lens circuitry to perform a focus search which shifts the focus lens by specifying the detection range and the number of in-detection-interval focal depths determined as the detection interval.

16. A focus lens driving method comprising:
communicating with a main body of an image capturing apparatus in a state where communication circuitry is mounted to the main body of the image capturing apparatus;
calculating, using circuitry, a number of focal depths, which represents a detection interval, as an amount of shift of a focus lens in response to receiving an instruction to shift the focus lens from the main body of the image capturing apparatus, by specifying a detection range, in which the focus lens is shifted to detect a contrast of a captured image signal, and the detection interval represented by the number of focal depths which are division units of the detection range and each of which is based on a corresponding position of the focus lens; and
shifting, using the circuitry, the focus lens based on the calculated number of focal depths as the amount of shift of the focus lens.

17. A non-transitory computer-readable storage medium storing computer-readable instructions that, when executed by a computer, cause the computer to perform a method comprising:
calculating a number of in-detection-range focal depths as a number of focal depths, which are divided as division units and each of which is based on a corresponding position of a focus lens, in accordance with a detection range in which the focus lens is shifted to detect a contrast of a captured image signal;
determining a number of in-detection-interval focal depths, which represents the number of focal depths as the division units, as a detection interval in a detection range, based on the calculated number of in-detection-range focal depths as compared to a plurality of predetermined ranges of in-detection-range focal depths of a detection interval table stored in memory; and
instructing lens circuitry to perform a focus search which shifts the focus lens by specifying the detection range and the number of in-detection-interval focal depths determined as the detection interval.

18. A non-transitory computer-readable storage medium storing computer-readable instructions that, when executed by a computer, cause the computer to perform a method comprising:
- communicating with a main body of an image capturing apparatus in a state where communication circuitry is mounted to the main body of the image capturing apparatus;
- calculating, using circuitry, a number of focal depths, which represents a detection interval, as an amount of shift of a focus lens in response to receiving an instruction to shift the focus lens from the main body of the image capturing apparatus, by specifying a detection range, in which the focus lens is shifted to detect a contrast of a captured image signal, and the detection interval represented by the number of focal depths which are division units of the detection range and each of which is based on a corresponding position of the focus lens; and
- shifting, using the circuitry, the focus lens based on the calculated number of focal depths as the amount of shift of the focus lens.

* * * * *